United States Patent
Bala et al.

(10) Patent No.: US 10,523,475 B2
(45) Date of Patent: Dec. 31, 2019

(54) PULSE-SHAPED ORTHOGONAL FREQUENCY DIVISION MULTIPLEXING

(71) Applicant: IDAC HOLDINGS, INC., Wilmington, DE (US)

(72) Inventors: Erdem Bala, East Meadow, NY (US); Rui Yang, Greenlawn, NY (US); Jialing Li, San Diego, CA (US); Daniel R. Cohen, Huntington, NY (US)

(73) Assignee: IDAC Holdings, Inc., Wilmington, DE (US)

(*) Notice: Subject to any disclaimer, the term of this patent is extended or adjusted under 35 U.S.C. 154(b) by 0 days.

(21) Appl. No.: 14/766,040

(22) PCT Filed: Feb. 4, 2014

(86) PCT No.: PCT/US2014/014717
§ 371 (c)(1),
(2) Date: Aug. 5, 2015

(87) PCT Pub. No.: WO2014/123926
PCT Pub. Date: Aug. 14, 2014

(65) Prior Publication Data
US 2015/0372843 A1   Dec. 24, 2015

Related U.S. Application Data

(60) Provisional application No. 61/760,938, filed on Feb. 5, 2013, provisional application No. 61/871,461, filed on Aug. 29, 2013.

(51) Int. Cl.
*H04L 25/03* (2006.01)
*H04L 27/26* (2006.01)

(52) U.S. Cl.
CPC .... *H04L 25/03834* (2013.01); *H04L 27/2602* (2013.01); *H04L 27/2634* (2013.01); *H04L 27/2649* (2013.01); *H04L 27/2607* (2013.01)

(58) Field of Classification Search
CPC ........... H04L 25/03834; H04L 27/2602; H04L 27/2634; H04L 27/2649
See application file for complete search history.

(56) References Cited

U.S. PATENT DOCUMENTS

| 4,837,830 A | 6/1989 | Wrench, Jr. et al. |
| 7,826,415 B2 * | 11/2010 | Oh ........................ H04L 5/0007 370/329 |

(Continued)

FOREIGN PATENT DOCUMENTS

| CN | 1536559 A | 10/2004 |
| CN | 101425888 A | 5/2009 |

(Continued)

OTHER PUBLICATIONS

3GPP Technical Specification—TS 36.211 v10.4.0 (Dec. 2011). 3$^{rd}$ Generation Partnership Project; Technical Specification Group Access Network; Evolved Universal Terrestrial Radio Access (E-UTRA); Physical Channels and Modulation (Release 10).

(Continued)

*Primary Examiner* — Janice N Tieu
(74) *Attorney, Agent, or Firm* — Volpe and Koenig, P.C.

(57) ABSTRACT

A method and apparatus for performing pulse shaping using different windowing functions for different sub-bands of a transmission is disclosed. A method for use in a wireless transmit/receive unit (WTRU) may include the WTRU receiving data symbols. The WTRU may assign the data symbols to a plurality of subcarriers in different sub-bands and map the data symbols on each of the plurality of subcarriers in the different sub-bands to a plurality of corresponding subcarriers of an inverse fast Fourier transform (IFFT) block. The WTRU may take an IFFT of the block for each sub-band and pad an output of the IFFT block with a prefix and a postfix for each sub-band. The WTRU may apply a windowing function to an output of the padding (Continued)

for each sub-band and form a composite signal for transmission by adding an output of the windowing of each sub-band. The WTRU may transmit the signal.

11 Claims, 29 Drawing Sheets

(56) References Cited

U.S. PATENT DOCUMENTS

| | | | |
|---|---|---|---|
| 8,126,070 | B2 | 2/2012 | Hyllander et al. |
| 8,526,529 | B2 | 9/2013 | Ahn et al. |
| 8,615,000 | B2 | 12/2013 | Seyama et al. |
| 8,681,729 | B2 * | 3/2014 | Wengerter ............ H04L 1/0072 370/329 |
| 2003/0227978 | A1 | 12/2003 | Magee et al. |
| 2004/0100939 | A1 * | 5/2004 | Kriedte ................. H04L 1/06 370/347 |
| 2005/0001761 | A1 | 1/2005 | Kliewer et al. |
| 2005/0171995 | A1 | 8/2005 | Grindahl et al. |
| 2005/0276359 | A1 | 12/2005 | Xiong |
| 2006/0039273 | A1 | 2/2006 | Gore et al. |
| 2006/0045001 | A1 | 3/2006 | Jalali |
| 2006/0209927 | A1 * | 9/2006 | Khandekar ........... H04L 5/0048 375/146 |
| 2006/0285483 | A1 | 12/2006 | Khan |
| 2008/0137762 | A1 | 6/2008 | Waters et al. |
| 2009/3255891 | | 12/2009 | Michel et al. |
| 2010/0291925 | A1 * | 11/2010 | Nagata ................. H04J 11/0069 455/434 |
| 2011/0135016 | A1 * | 6/2011 | Ahn ...................... H04L 5/0037 375/259 |
| 2012/0008590 | A1 * | 1/2012 | Novak .................. H04J 3/0682 370/330 |
| 2012/0129017 | A1 * | 5/2012 | Ota ..................... H01M 2/0404 429/7 |
| 2012/0189077 | A1 * | 7/2012 | Seo ....................... H04B 7/024 375/267 |
| 2013/0129017 | A1 | 5/2013 | Sahin et al. |

FOREIGN PATENT DOCUMENTS

| | | |
|---|---|---|
| CN | 101527037 A | 9/2009 |
| EP | 2 169 890 | 3/2010 |

OTHER PUBLICATIONS

Armstrong et al., "Analysis of new and existing methods of reducing intercarrier interference due to carrier frequency offset in OFDM," IEEE Transactions on Communication, vol. 47, No. 3, pp. 365-369 (Mar. 1999).

Bala et al., "Pulse shaped OFDM for Cognitive Radio," Wireless World Research Forum (WWRF) Meeting 30, Oulu, Finland (Apr. 23-25, 2013).

Beaulieu et al., "On the effects of receiver windowing on OFDM performance in the presence of carrier frequency offset," IEEE Transactions on Wireless Communications, vol. 6, No. 1, pp. 202-209 (Jan. 2007).

Bellanger et al., "FBMC physical layer: a primer," Physical Layer for Dynamic Access and Cognitive Radio (PHYDYAS) Report (Jun. 2010), downloaded from http://www.ict-phydyas.org.

Erceg et al., "Channel Models for Fixed Wireless Applications," IEEE 802.16 Broadband Wireless Access Working Group, IEEE 802.16.3c-01/29r4, (Jul. 17, 2001).

Farhang-Boroujeny, B., "OFDM Versus Filter Bank Multicarrier," IEEE Signal Processing Magazine, vol. 28, No. 3, pp. 92-112 (May 2011).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

Kapoor et al., "Interference suppression in DMT receivers using windowing," 2000 IEEE International Conference on Communications, 2000 (ICC 2000), vol. 2, pp. 778-782, (Jun. 18-22, 2000).

Li et al., "Resource block Filtered-OFDM for future spectrally agile and power efficient systems," Physical Communication, vol. 11, pp. 36-55 (Jun. 2014).

Lin et al., "A Filterbank Approach to Window Designs for Multicarrier Systems," IEEE Circuits and Systems Magazine, vol. 7, No. 1, pp. 19-30 (Mar. 12, 2007).

Louveaux et al., "Equalization and demodulation in the receiver (single antenna)," Physical Layer for Dynamic Access and Cognitive Radio (PHYDYAS) Report (Jul. 28, 2008), downloaded from: http://www.ict-phydyas.org.

Louveaux et al., "Optimization of transmitter and receiver," Physical Layer for Dynamic Access and Cognitive Radio (PHYDYAS) Report (Jul. 29, 2009), downloaded from: http://www.ict-phydyas.org.

Mueller-Weinfurtner et al., "Optimum Nyquist windowing in OFDM receivers," IEEE Transactions on Communications, vol. 49, No. 3, pp. 417-420 (Mar. 2001).

Muschallik et al., "Improving an OFDM reception using an adaptive Nyquist windowing," IEEE Transactions cn Ccnsurner Electronics, vol. 42, No. 3, pp. 259-269 (Aug. 1996).

Noguet et al., "Advances in opportunistic radio technologies for TVWS," EURASIP Journal on Wireless Communications and Networking, vol. 2011, No. 170 (Nov. 15, 2011), downloaded from: http://www.jwcn.eurasipjournals.com.

Redfern et al., "Receiver window design for multicarrier communication systems," IEEE Journal on Selected Areas in Communications, vol. 20, No. 5, pp. 1029-1036 (Jun. 2002).

Sahin et al., "A Survey on Prototype Filter Design for Filter Bank Based Multicarrier Communications" (Dec. 14, 2012), downloaded from: http://arxiv.org.

Siohan et al., "Analysis and design of OFDM/OQAM systems based on filterbank theory," IEEE Transactions on Signal Processing, vol. 50, No. 5, pp. 1170-1183, May 2002).

Sutton et al., "OFDM Pulse-Shaped Waveforms for Dynamic Spectrum Access Networks," 2010 IEEE Symposium on New Frontiers in Dynamic Spectrum, pp. 1-2, (Apr. 3-9, 2010).

Wang et al., "Advances in cognitive radio networks: A survey," IEEE Journal of Selected Topics in Signal Processing, vol. 5, No. 1, pp. 5-23 (Nov. 18, 2010).

Weiss et al., "Mutual interference in OFDM-based spectrum pooling systems," 2004 IEEE 59th Vehicular Technology Conference, 2004 (VTC 2004-Spring), vol. 4, pp. 1873-1877 (May 17-19, 2004).

Third Generation Partnership Project, "Technical Specification Group Radio Access Network; Evolved Universal Terrestrial Radio Access (E-UTRA); Physical Channels and Modulation (Release 11)," 3GPP TS 36.211 V11.1.0 (Dec. 2012).

Third Generation Partnership Project, "Technical Specification Group Radio Access Network; Evolved Universal Terrestrial Radio Access (E-UTRA); Physical Channels and Modulation (Release 11)," 3GPP TS 36.211 V11.5.0 (Dec. 2013).

Third Generation Partnership Project, "Technical Specification Group Radio Access Network; Evolved Universal Terrestrial Radio Access (E-UTRA); Physical Channels and Modulation (Release 12)," 3GPP TS 36.211 V12.0.0 (Dec. 2013).

Third Generation Partnership Project, "Technical Specification Group Radio Access Network; Feasibility study for Further Advancements for E-UTRA (LTE-Advanced) (Release 11)," 3GPP TR 36.912 V11.0.0 (Sep. 2012).

* cited by examiner

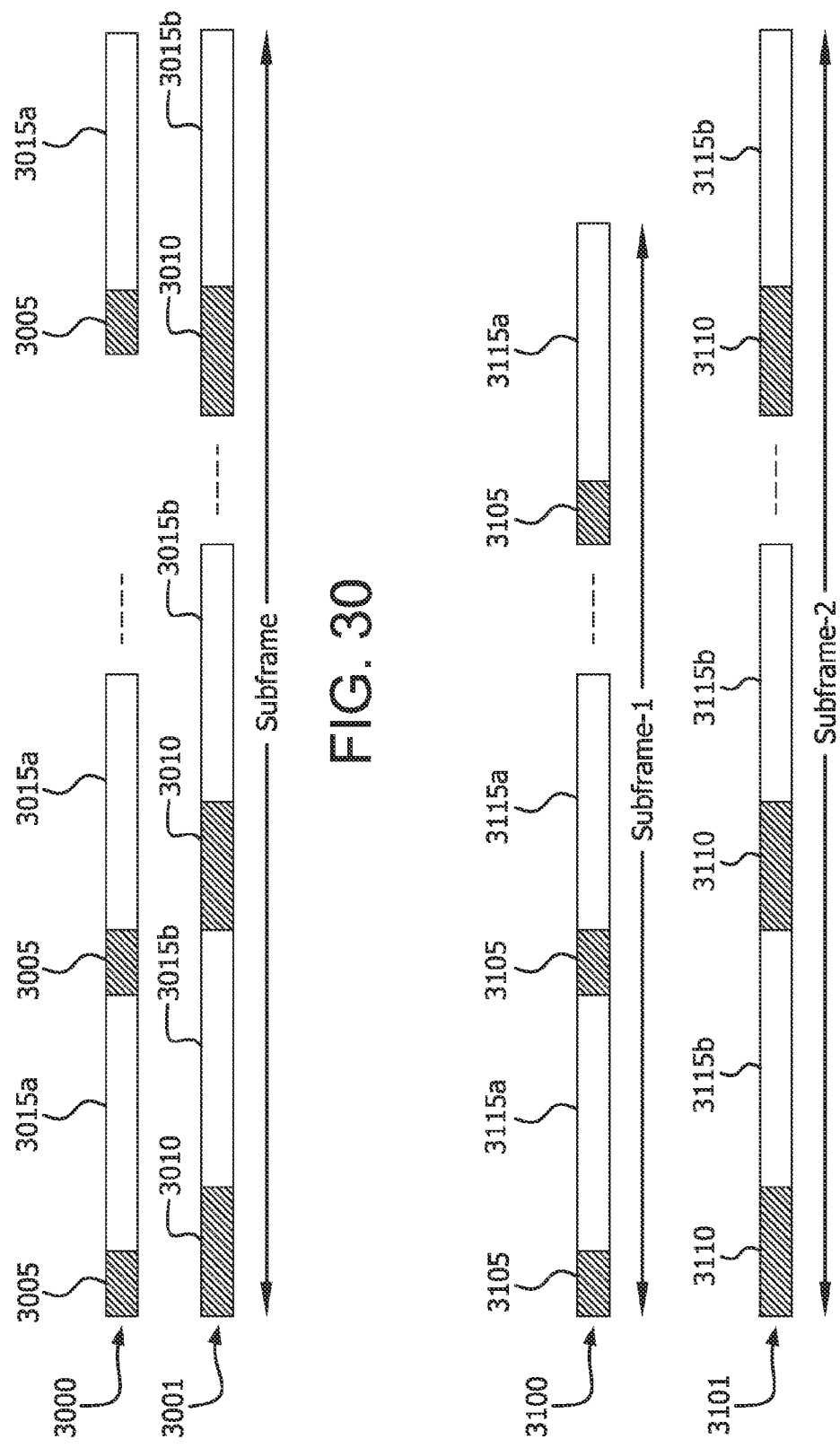

PULSE-SHAPED ORTHOGONAL FREQUENCY DIVISION MULTIPLEXING

CROSS REFERENCE TO RELATED APPLICATIONS

This application claims the benefit of U.S. provisional application No. 61/760,938 filed Feb. 5, 2013 and U.S. provisional application No. 61/871,461 filed Aug. 29, 2013, the contents of which are hereby incorporated by reference herein.

BACKGROUND

Multicarrier modulation (MCM) is based on the idea of splitting a high-rate wideband signal into multiple lower-rate signals, where each signal occupies a narrower band. Orthogonal frequency division multiplexing (OFDM) has proved itself as one of the most popular MCM techniques and is currently used in many wireless communication systems such as $3^{rd}$ Generation Partnership Project (3GPP) Long Term Evolution (LTE), 802.11, etc. OFDM offers many advantages such as robustness to multipath propagation, simple equalization, a simple transceiver architecture and efficient use of the available bandwidth through overlapping subchannels. On the other hand, OFDM has several disadvantages such as spectral leakage due to high sidelobes, and high peak-to-average power ratio (PAPR).

The demand for higher data rates has been increasing significantly. Several techniques have been studied and proposed to meet this demand, such as overlaying small cells over macro cells to allow spectral reuse, opening new bands to wireless communication, and utilizing the bandwidth more efficiently by spectrum sharing via cognitive radio. Since wireless systems are evolving towards a "network of networks" architecture where many networks are expected to share the spectrum, spectrally agile waveforms with small out-of-band leakage are important. To that end, the adjacent channel interference created by the spectral leakage of OFDM makes this waveform unsuitable for these networks.

As an alternative to OFDM, filter bank multicarrier (FBMC) modulation schemes, specifically OFDM-Offset quadrature amplitude modulation (QAM), have recently taken interest. OFDM-OQAM is another MCM technique where data on each sub-carrier is shaped with an appropriately designed pulse so that sidelobes are lower. A real data symbol is transmitted in each subchannel and on each OFDM-OQAM symbol. Consecutive OFDM-OQAM symbols are staggered. Adjacent subchannels overlap to maximize the spectral efficiency, creating intercarrier interference (ICI); and consecutive OFDM-OQAM symbols interfere with each other due to the long pulse, creating intersymbol interference (ISI). In an ideal single path Additive White Gaussian Noise (AWGN) channel, perfect orthogonality may be achieved and ISI/intercarrier interference (ICI) may be cancelled. The OFDM-OQAM transmitter and receiver may be implemented in an efficient manner by using the polyphase filterbanks. Although OFDM-OQAM offers less spectral leakage, its implementation in practical systems poses several challenges due to its complexity, latency, and more complex channel estimation and equalization algorithms in doubly dispersive channels. Therefore, it is desirable to design an OFDM-like, but spectral contained waveform with improved out-of-band emission characteristics.

Therefore, there is a need for an advanced waveform for spectral agile systems that is capable of sharing opportunistically available and non-contiguous spectrum resources with other users. The characteristics of such a waveform should include low out-of-band emission (DOBE), low in-band distortion, low complexity, low latency, low PAPR, robustness to frequency and timing asynchronous, and robustness to power amplifier (PA) nonlinearity. The existing baseband waveforms in those systems possess very large DOBE, which may make it difficult for the existing baseband waveforms to be used in spectral agile systems.

SUMMARY

Methods and apparatus for performing transmitter and receiver side pulse shaping using different windowing functions for different sub-bands of a transmission are disclosed. A method for use in a wireless transmit/receive unit (WTRU) for performing transmitter side pulse shaping may include the WTRU receiving data symbols. The WTRU may assign the data symbols to a plurality of subcarriers in the different sub-bands and map the data symbols on each of the plurality of subcarriers in the different sub-bands to a plurality of corresponding subcarriers of an inverse fast Fourier transform (IFFT) block. The WTRU may take an IFFT of the block for each sub-band and pad an output of the IFFT block with a cyclic prefix (CP) and a postfix for each sub-band. The WTRU may apply a windowing function to an output of the padding for each sub-band and form a composite signal for transmission by adding an output of the windowing of each sub-band. The WTRU may transmit the signal.

A method for use in a wireless transmit/receive unit (WTRU) for performing receiver side pulse shaping may include a WTRU receiving a signal comprising data symbols and assigning the data symbols to a plurality of subcarriers in the different sub-bands. The WTRU may apply a receive windowing function to each sub-band and map the data symbols on each of the plurality of subcarriers in the different sub-bands to a plurality of corresponding subcarriers of a fast Fourier transform (FFT) block. The WTRU may take an FFT of the block for each sub-band and apply further processing to an output of the FFT block for each sub-band.

Methods and apparatus for performing transmitter and receiver side pulse shaping with zero-padded OFDM instead of OFDM with cyclic prefix (CP) are also disclosed. Methods and apparatus for improving performance of receive windowing, including interference cancellation, CP overhead reduction, and the utilization of CP samples, are also disclosed.

BRIEF DESCRIPTION OF THE DRAWINGS

A more detailed understanding may be had from the following description, given by way of example in conjunction with the accompanying drawings wherein:

FIG. 30 is a diagram of an example frame structure corresponding to two signals; and FIG. 31 is a diagram of an example frame structure corresponding to two signals.

DETAILED DESCRIPTION

Figure 1A:
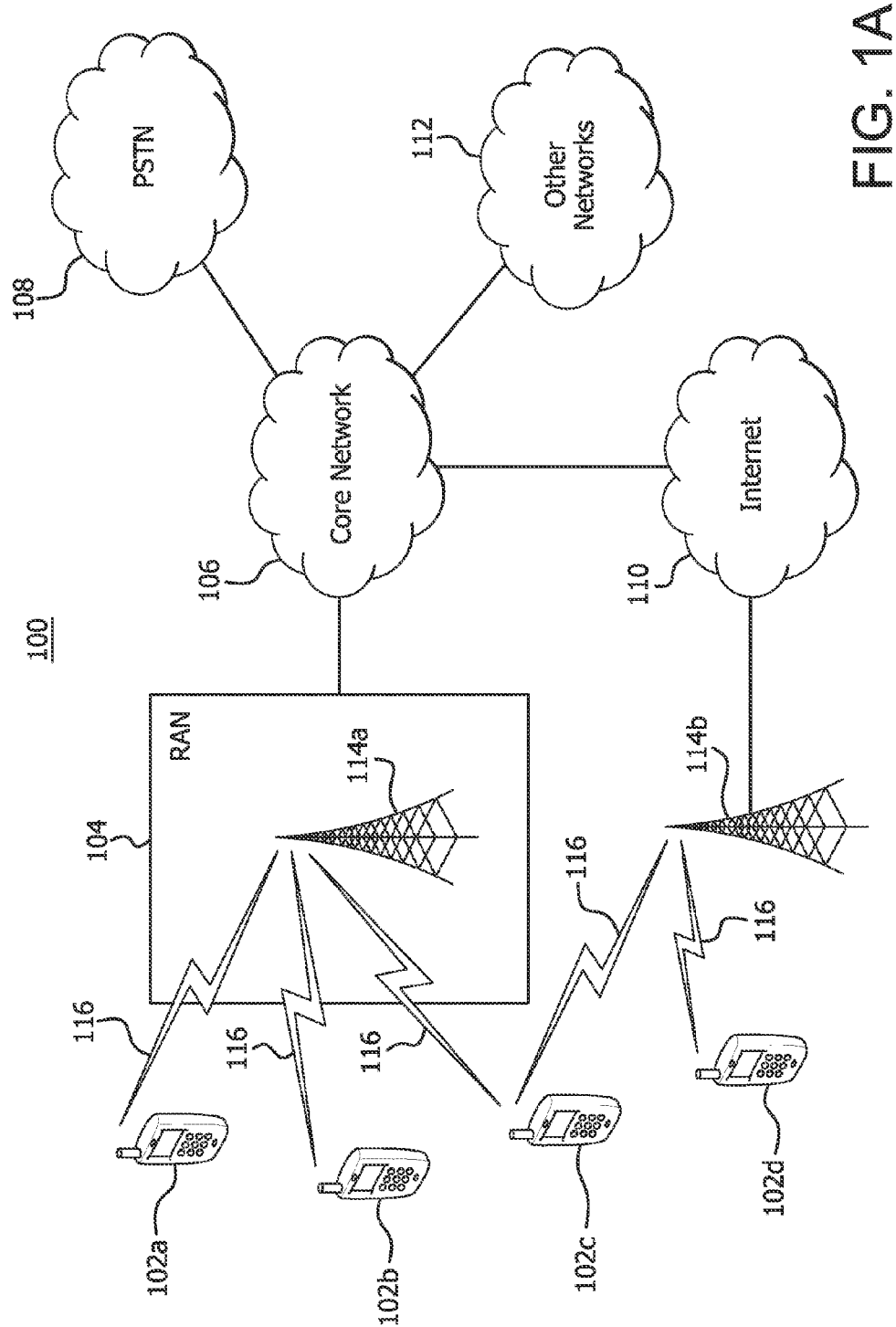
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
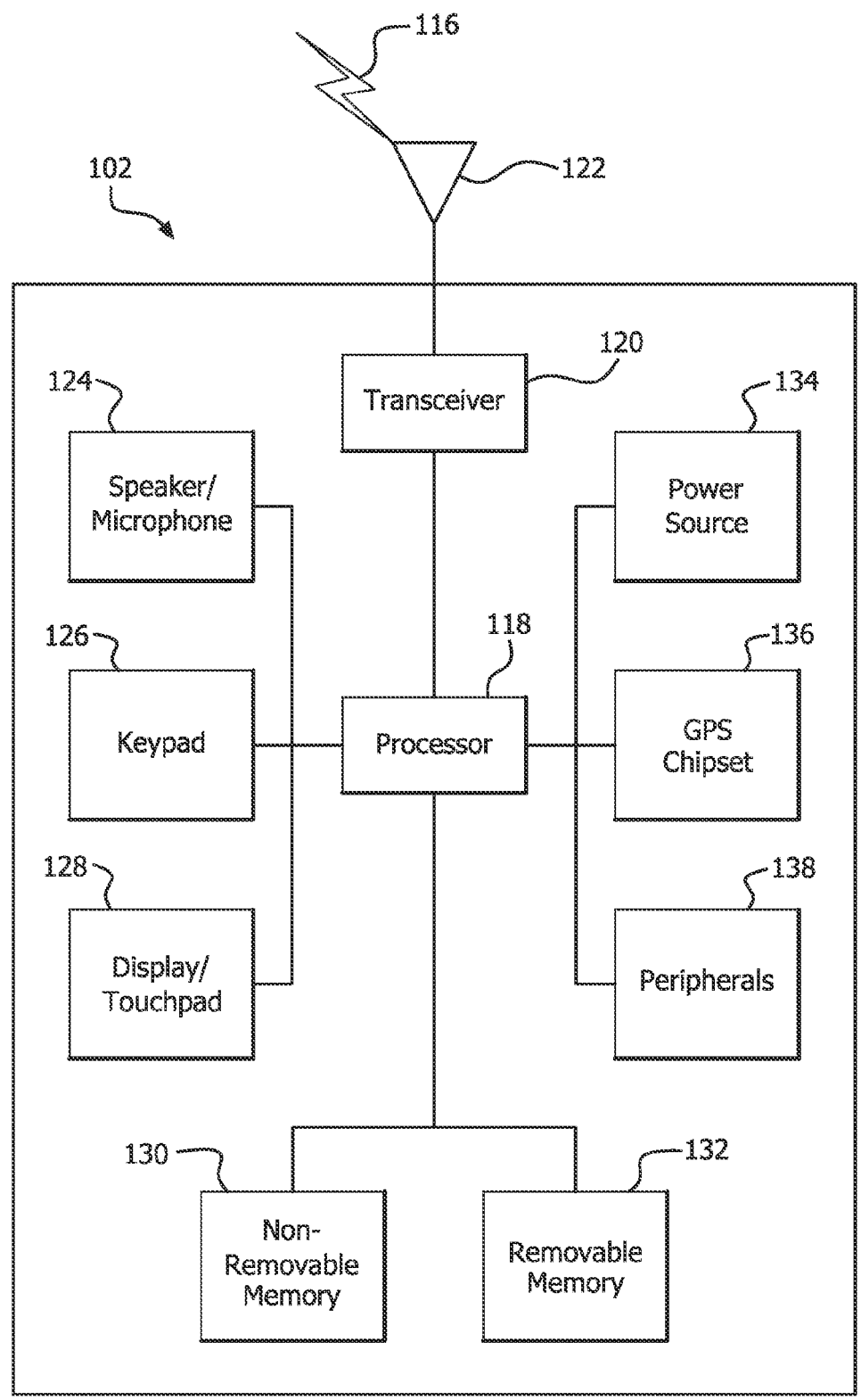
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
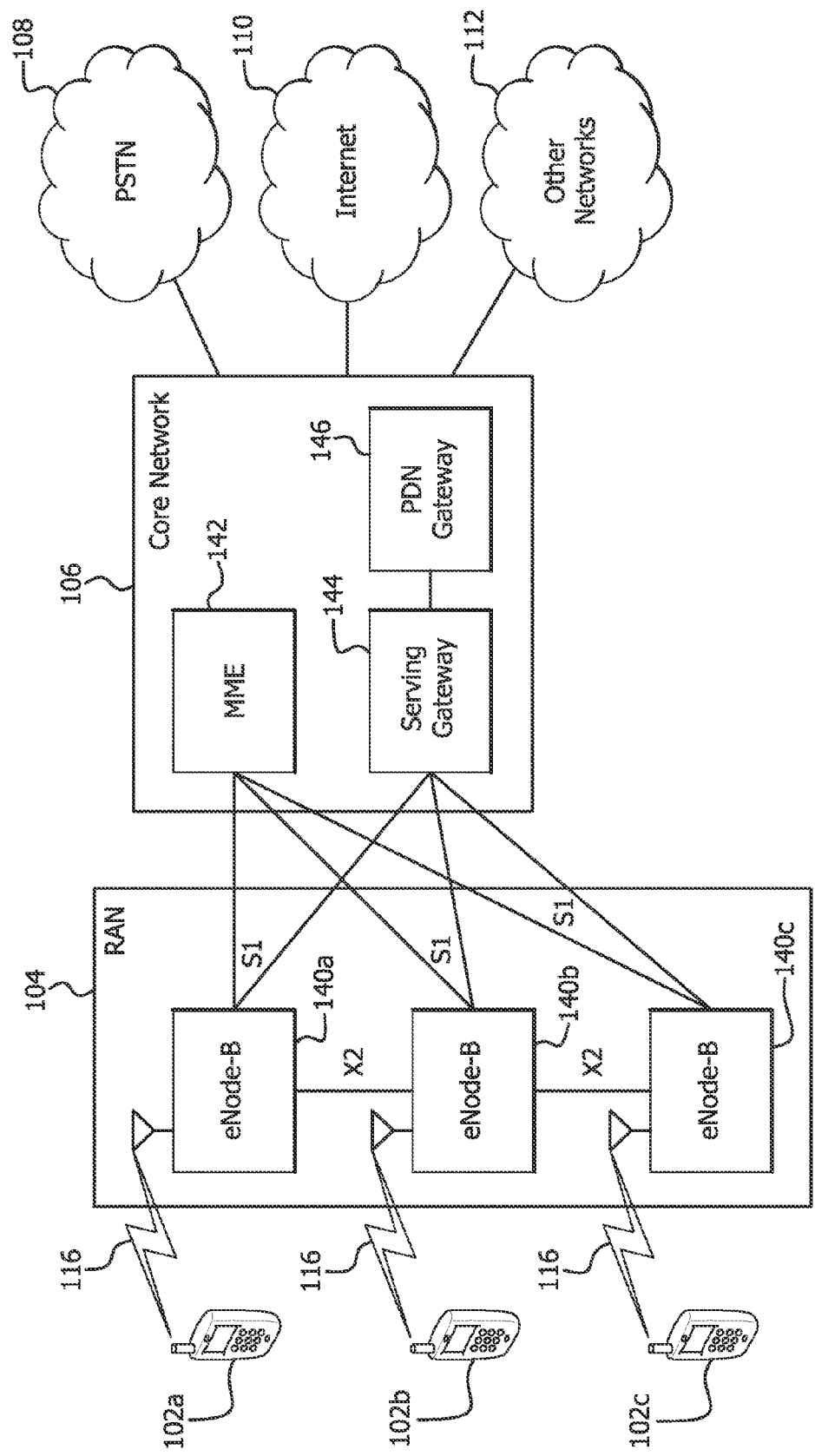
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

One way to improve the spectral containment of OFDM may be by filtering the time domain signal at the output of the OFDM modulator. In a fragmented spectrum where available sub-bands are not contiguous, filtering becomes challenging since a separate filter may need to be designed and used for each fragment.

Another method used to improve the spectral containment of OFDM is pulse shaping, also known as windowing. It should be noted that the terms pulse shaping and windowing may be used interchangeably throughout this description and are meant to have the same connotation. Pulse shaping is a method used to reduce the spectral leakage at the transmitter. Pulse shaping may also be used to reject adjacent channel interference at the receiver. In this technique, the rectangular pulse shape of the OFDM symbol is smoothed to prevent sharp transitions between consecutive OFDM symbols, resulting in lower sidelobes. A mechanism is deployed at the receiver to reject the adjacent channel interference leakage. This is because even if the interfering signal in the adjacent band has low out-of-band emission, the spectral leakage from the interfering signal increases after cyclic prefix (CP) removal if the received filter covers the whole accessible band. Therefore, before CP is removed, the received signal should be filtered for individual sub-bands.

Similar to transmitter filtering, receive filtering imposes challenges in fragmented spectrum. Receive windowing has been used to reduce the impact of ICI due to carrier frequency offset or Doppler and to suppress radio frequency interference (RFI) in discrete multitone (DMT) systems.

In current OFDM-based communications systems, e.g., LTE, a CP may be used in OFDM to mitigate ISI due to multipath channel or timing offset distortion. CP may be prepended at the output of the inverse fast Fourier transform (IFFT) at the transmitter side and discarded at the receiver side before the fast Fourier transform (FFT). The overhead due to the CP may be significant. Therefore, reducing this overhead while not degrading the system performance is beneficial. This is because some WTRUs may be in different locations in a cell and experience different delay spreads, and some WTRUs may need shorter CP than others. This is true for both downlink and uplink transmission.

In addition, CP in OFDM carries useful information since it is a replica of the time domain samples at the tail of an OFDM symbol. CP may also be used at single carrier systems and again consists of the time domain samples at the tail of the symbol. As noted previously, CP is discarded at the receiver since it is contaminated by ISI. However, most of the time, the channel delay spread is smaller than the length of the CP, resulting in some of the CP samples being free of ISI. These samples may be used at the receiver to improve performance.

A transceiver architecture based on transmit and receive pulse shaping to reduce spectral leakage and reject adjacent channel interference in multicarrier modulation systems; methods and apparatus for transmitter side implementation of pulse shaping on time domain samples of each symbol for OFDM based systems; methods and apparatus for receiver side implementation of windowing on time domain samples of each symbol for OFDM based systems; and methods for applying windowing over a plurality of received OFDM data block are described herein.

A general MCM scheme will now be described. For a general MCM scheme, the input data sequence to be transmitted on the k'th subcarrier and l'th symbol may be denoted as $S_k[l]$, where k denotes the subcarrier index and l denotes the symbol index. Then, the input data symbols for the k'th subcarrier may be written as $$x_k(t) = \sum_{l=-\infty}^{\infty} S_k[l]\delta[t-lT'], \quad \text{Equation (1)}$$

where T' is the symbol interval. The data on each subcarrier may be convolved by a filter p(t) that is modulated to the frequency of that subcarrier. The aggregate transmitted signal may be written as $$x(t) = \sum_{k=0}^{M-1} [\{\sum_{l=-\infty}^{\infty} S_k[l]\delta[t-lT']\} * \{p(t)e^{j2\pi kF_s t}\}], \quad \text{Equation (2)}$$

where M is the total number of subcarriers and $F_s$ is the spacing between the subcarriers.

$$T \stackrel{def}{=} \frac{1}{F_s}$$

is typically equal to or smaller than T'.

After expanding the convolution in Equation 2, the following may be obtained:

$$x(t) = \sum_{k=0}^{M-1} \sum_{l=-\infty}^{\infty} \sum_{\tau=-\infty}^{\infty} S_k[l]\delta(\tau-lT')p(t-\delta)e^{j2\pi kF_s(t-\tau)}. \quad \text{Equation (3)}$$

Since $\delta(\tau-lT')=0$, $\tau \neq lT'$, the following may be obtained:

$$x(t) = \sum_{k=0}^{M-1} \sum_{l=-\infty}^{\infty} S_k[l]p(t-lT')e^{j2\pi kF_s t}e^{-j2\pi kF_s(lT')}. \quad \text{Equation (4)}$$

Equation (4) may be viewed as the general multicarrier modulation scheme.

An example of the OFDM structure will now be described. With respect to OFDM, it may be assumed that the signal in Equation (4) is sampled at a sampling rate of $T_s = T/N$ and that $T' = \lambda T_s$. Here, the discrete-time of Equation (4) may be written as:

$$x[n] \stackrel{def}{=}$$  Equation (5)

$$x(nT_s) = \sum_{k=0}^{M-1} \sum_{\ell=-\infty}^{\infty} S_k[\ell]p(nT_s - \ell\lambda T_s)e^{\frac{j2\pi knT_s}{NT_s}} e^{-\frac{j2\pi k(\ell\lambda T_s)}{NT_s}} =$$

$$\sum_{k=0}^{M-1} \sum_{\ell=-\infty}^{\infty} S_k[\ell]p[n - \ell\lambda]e^{\frac{j2\pi kn}{N}} e^{-\frac{j2\pi k\ell\lambda}{N}},$$

where n denotes the time sample index.

For OFDM without CP with critical sampling, the parameters in Equation (5) are as follows:

$$N = M = \lambda$$

$$p[n] = \begin{cases} 1, & n = 0, 1, \ldots N-1 \\ 0, & \text{otherwise} \end{cases}.$$

With these parameters, Equation (5) may be written as $$x[n] = \sum_{k=0}^{N-1} \sum_{\ell=-\infty}^{\infty} S_k[\ell]p[n - \ell\lambda]e^{\frac{j2\pi kn}{N}}. \quad \text{Equation (6)}$$

Since the consecutive symbols do not overlap, only a single l'th OFDM symbol may be considered:

$$x^l[n] = \sum_{k=0}^{N-1} S_k[\ell] e^{\frac{j2\pi kn}{N}}, n = \ell N, \ldots \ell N + N - 1. \quad \text{Equation (7)}$$

From Equation (7), the l'th OFDM symbol may be computed by taking the inverse fast Fourier transform (IFFT) of the input data symbols.

When a CP is appended, the pulse shape may be defined as:

$$p[n] = \begin{cases} 1, n = -N_G, \ldots, 0, 1, \ldots N-1 \\ 0, \text{ otherwise} \end{cases},$$

where $N_G$ is the number of samples in the guard interval, e.g., cyclic prefix. Again, the consecutive OFDM symbols may not overlap, so it may be sufficient to consider a single OFDM symbol. The parameters in Equation (5) may be as follows:

$$N = M, \lambda = N + N_G, \quad \text{Equation (8)}$$

$$x^l[n] = \sum_{k=0}^{M-1} S_k[\ell] p[n - l(N+N_G)] e^{\frac{j2\pi k(n-l(N+N_G))}{N}},$$

$$n = l(N+N_G) - N_G, \ldots, l(N+N_G) + N - 1.$$

Defining $n=l(N+N_G)+m$, where $m=-N_G, \ldots, 0, 1, \ldots N-1$, then:

$$x^l[l(N+N_G)+m] = \sum_{k=0}^{M-1} S_k[\ell] p[m] e^{\frac{j2\pi k(m)}{N}}, \quad \text{Equation (9)}$$

$$m = -N_G, \ldots, 0, 1, \ldots N-1$$

Since $p[m] = 1$, and $e^{\frac{j2\pi k(m)}{N}} = e^{\frac{j2\pi k(m+N)}{N}}$, $$x^l[l(N+N_G)+m] = \sum_{k=0}^{M-1} S_k[\ell] p[m] e^{\frac{j2\pi k(m)}{N}},$$

$$m = -N_G, \ldots, -1 \text{ and}$$

$$x^l[l(N+N_G)+m] = \sum_{k=0}^{M-1} S_k[\ell] p[m] e^{\frac{j2\pi k(m+N)}{N}},$$

$$m = N - N_G, \ldots, N-1$$

are equal. Therefore, Equation (8) may be implemented by taking the IFFT of the input data symbols, and padding the last $N_G$ samples of the IFFT output to the front of the IFFT output.

As discussed above, pulse shaping, also known as windowing, may be used at the transmitter side and receiver side to improve the spectral containment of OFDM.

Methods and apparatus for transmitter side windowing will now be described. As an example, the pulse shaping function for windowing in Equation (5) may be defined as $$p[n] = \begin{cases} 0.5\left(1 + \cos\left\{\pi\left(1 + \frac{n}{\beta N_T}\right)\right\}\right) & 0 \le n < \beta N_T \\ 1 & \beta N_T \le n < (\beta+1)N_T \\ 0.5\left(1 + \cos\left\{\pi \frac{n - (\beta+1)N_T}{\beta N_T}\right\}\right) & (\beta+1)N_T \le n \le (2\beta+1)N_T - 1 \end{cases} \quad \text{Equation (10)}$$

where $N_T=N+N_G$, and $\lambda=(1+\beta)N_T$. Other pulse shaping functions are also possible. Pulse shaping functions should generally create a smooth transition at the boundary of two consecutive symbols. In this case, the new guard interval is generally larger than the cyclic prefix. $N'_G=N_G+N_{EGI}$ may be defined, where $N_{EGI}$ is the extended guard interval. However, from a signal processing point of view, $N'_G$ is nothing but a longer cyclic prefix. It should be noted that windowing functions other than the one in Equation (10) are also possible, but the following approach will be similar.

Defining $n=i(1+\beta)N_T+m$, where $m=0, \ldots, (1+\beta)N_T-1$, Equation (4) may be written as $$x[i(1+\beta)N_T+m] = \quad \text{Equation (11)}$$

$$\sum_{k=0}^{M-1} \sum_{\ell=-\infty}^{\infty} S_k[\ell] p[i(1+\beta)N_T+m - \ell(1+\beta)N_T] \times$$

$$e^{j2\pi k F_0(i(\beta+1)N_T+m)} e^{-j2\pi k F_0(\ell(1+\beta)N_T)},$$

which may be written as $$x_i'[m] = \sum_{k=0}^{M-1} \sum_{\ell=-\infty}^{\infty} S_k[\ell] p[(i-\ell)(1+\beta)N_T+m] e^{j2\pi k F_0(i(\beta+1)N_T+m)} e^{-j2\pi k F_0(\ell(1+\beta)N_T)}, \quad \text{Equation (12)}$$

defining $x'[m]=x[i(1+\beta)N_T+m]$.

Since for the i'th block, only two symbols overlap due to the pulse shape design where the pulse shape should not be much longer than N, the terms corresponding to $l=i$ and $l=i-1$ in the summation over l are retained. Then, $$x_i'[m] = \sum_{k=0}^{M-1} S_k[i-1] p[(1+\beta)N_T+m] \quad \text{Equation (13)}$$

$$e^{\frac{j2\pi k((\beta+1)N_T+m)}{N}} e^{-\frac{j2\pi k((i-1)(1+\beta)N_T)}{N}} +$$

$$\sum_{k=0}^{M-1} S_k[i] p[m] e^{\frac{j2\pi k(i(\beta+1)N_T+m)}{N}} e^{-\frac{j2\pi k(i(1+\beta)N_T)}{N}},$$

which is equal to $$x_i'[m] = \sum_{k=0}^{M-1} S_k[i-1] p[(1+\beta)N_T+m] e^{\frac{j2\pi k((1+\beta)N_T+m)}{N}} + \quad \text{Equation (14)}$$

$$\sum_{k=0}^{M-1} S_k[i] p[m] e^{\frac{j2\pi km}{N}}.$$

In Equation (14), it can be seen that for the first term is non-zero for $m=0, 1, \ldots, \beta N_T$ has non-zero values. The limits where the pulse shape is defined may be seen in Equation (10). Therefore, the implementation, as shown in FIG. 2, may be used.

Figure 2:
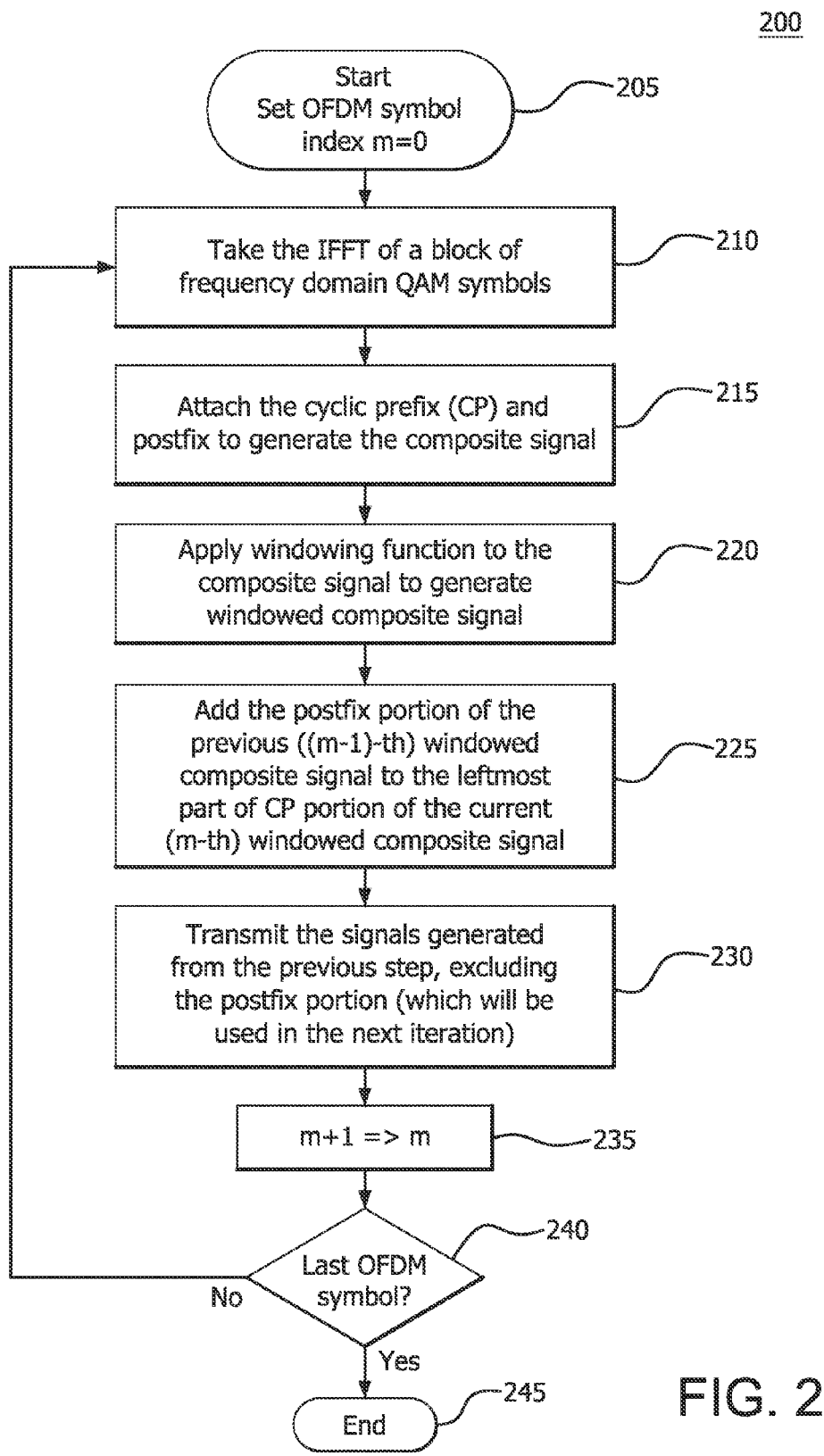
FIG. 2 is a flow chart of an example transmit windowing implementation procedure using cyclic prefix (CP)

FIG. 2 is a flow chart of an example transmit windowing implementation procedure using CP 200. The example transmit implementation procedure 200 is a direct implementation from Equation (14). Referring to FIG. 2, the OFDM symbol index is set to m=0 in step 205. Next, the transmitter takes the IFFT of a block of frequency domain QAM symbols in step 210. For example, if the IFFT size is N=8, the samples at the output of the IFFT for the m-th OFDM symbol are $a^{(m)}=[a_1^{(m)},a_2^{(m)},a_3^{(m)},a_4^{(m)},a_5^{(m)}a_6^{(m)},a_7^{(m)},a_8^{(m)}]$. In step 215, a cyclic prefix (CP) and a postfix are attached to the output samples to generate a composite signal. Assuming the CP length is 4, and the postfix length is 2, after the CP and postfix is attached, the composite signal becomes $s^{(m)}=[a_5^{(m)},a_6^{(m)},a_7^{(m)},a_8^{(m)},a_1^{(m)},a_2^{(m)},a_3^{(m)},a_4^{(m)},a_5^{(m)},a_6^{(m)},a_7^{(m)},a_8^{(m)},a_1^{(m)},a_2^{(m)}]$. In step 220, a windowing function is applied to the composite signal to generate a windowed composite signal. It should be noted that the windowing function may be applied in different ways. For example, if "$\beta N_T$"=2, that is, windowing takes two samples on each side to ramp up and down, then $s_w^{(m)}=[p_1a_5^{(m)},p_2a_6^{(m)},a_7^{(m)},a_8^{(m)},a_1^{(m)},a_2^{(m)},a_3^{(m)},a_4^{(m)},a_5^{(m)},a_6^{(m)},a_7^{(m)},a_9^{(m)},p_{13}a_1^{(m)},p_{14}a_2^{(m)}]$, where $0=p_1<p_2<1$, and $0=p_{14}<p_{13}<1$. In step 225, the postfix portion of the previous $(m-1)^{th}$ windowed composite signal is added to the leftmost part of the CP portion of the current $m^{th}$ windowed composite signal. In step 230, the signals generated from step 225 are transmitted, excluding the postfix portion, which will be used in the next iteration. The transmitted samples for the $m^{th}$ symbol is $s_{w\text{-}TX}^{(m)}=[p_2a_1^{(m-1)}+p_1a_5^{(m)}, p_1a_2^{(m-1)}+p_2a_6^{(m)},a_7^{(m)},a_8^{(m)},a_1^{(m)},a_2^{(m)},a_3^{(m)},a_4^{(m)},a_5^{(m)},a_6^{(m)},a_7^{(m)},a_8^{(m)}]$
In step 235, the OFDM symbol index is increased by 1, m+1=>m, to apply the process to the next consecutive symbol. If m+1 is not the last symbol, steps 210-240 are repeated for the next consecutive symbol. If m+1 is the last OFDM symbol, then the process is complete in step 245.

Figure 3:
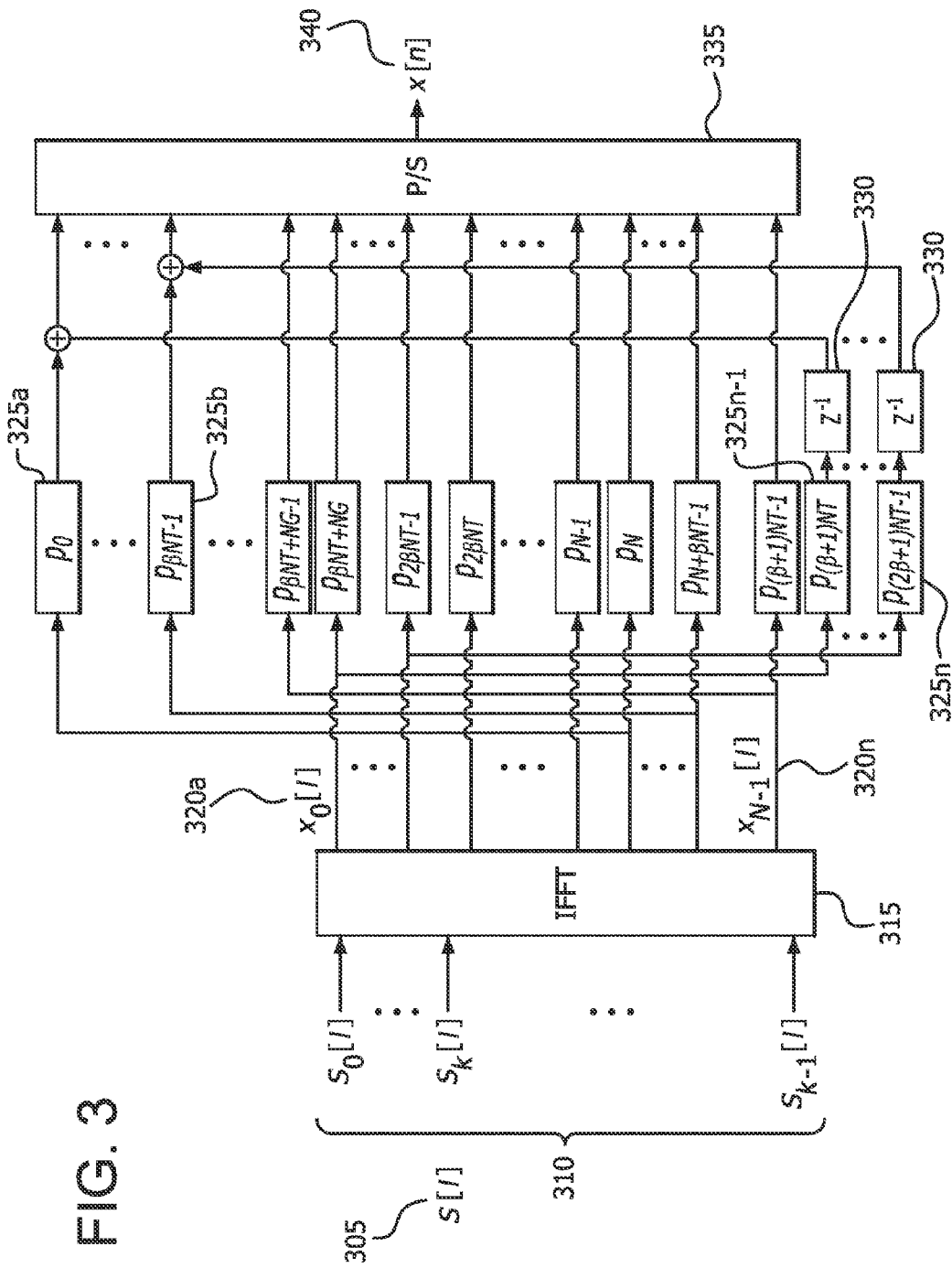
FIG. 3 is a block diagram of an example transmitter module configured to implement transmit windowing with cyclic prefix (CP)

FIG. 3 is a block diagram of an example transmitter module configured to implement transmit windowing with cyclic prefix. The implementation shown in FIG. 3 is a practical implementation of Equation (14).

Referring to FIG. 3, the l'th symbol 305 from an input data stream that has been spread across a plurality of multiple parallel sub-carriers 310 of a frequency band is input into an IFFT unit 315. The IFFT unit may be an N-point IFFT unit. The IFFT unit 315 converts the signals in the plurality of sub-carriers 310 from the frequency domain to corresponding time domain signals 320*a-n*. The CP and the postfix are appended to generate a composite signal and then, the composite signal is multiplied by a windowing function p[m], m=0, 1, . . . , $(2\beta+1)N_T-1$, at the respective windowing modules 325*a-n*. The last $\beta N_T$ samples, corresponding to the postfix, of the output of the windowing modules 325*n-1*, 325*n* may be kept in buffers 330. The last $\beta N_T$ samples, corresponding to the postfix, in the buffers 330 are then added to the first $\beta N_T$ samples corresponding to the prefix portion of the output of the next symbol by windowing modules 325*a*, 325*b*. Note that the samples may be added to the buffer before the contents of the buffer are updated. The transmitter may then transmit the first $(1+\beta)N_T$ samples. A parallel-to-serial converter (P/S) 335 receives the samples and converts them into an OFDM signal 340 for transmission.

Figure 4:
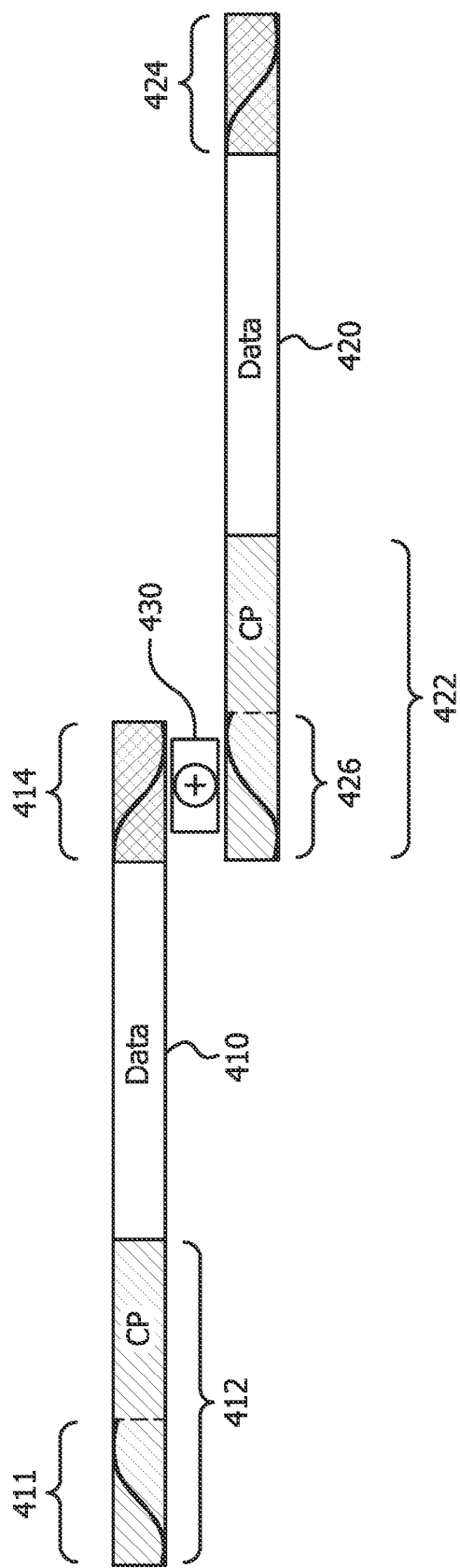
FIG. 4 is a diagram of an example application of transmit windowing in accordance with the method described in FIG. 2.

FIG. 4 is a diagram of an example application of transmit windowing in accordance with the method described in FIG. 2. It should be noted that for purposes of illustration and for the reader's convenience, only two data blocks are shown. It should be noted that there may be any number of data blocks before and after the data blocks shown in FIG. 4. As described in FIG. 2, the method may continue until the last data block in the signal is processed. Referring to FIG. 4, a first data block 410 and a second data block 420 are shown. The first data block 410 has a CP 412 prepended to the beginning of the data block 410 and a postfix 414 appended to the end of the data block 410. The leftmost part 411 of the CP 412 and the postfix 414 of the first data block 410 have been windowed. Similarly, the second data block 420 has a CP 422 prepended to the beginning of the data block 420 and a postfix 424 appended to the end of the data block 420. The leftmost part 426 of the CP 422 and the postfix 424 of the second data block 420 have been windowed. It is important to note that windowing is applied independently on each of the data blocks 410, 420 as in the method described in FIG. 2. The postfix 414 of the first data block 410 overlaps in time with the windowed part 426 of the CP 422 of the second data block 420. The postfix 414 and the windowed part 426 of the CP 422 are effectively summed 430.

Figure 5:
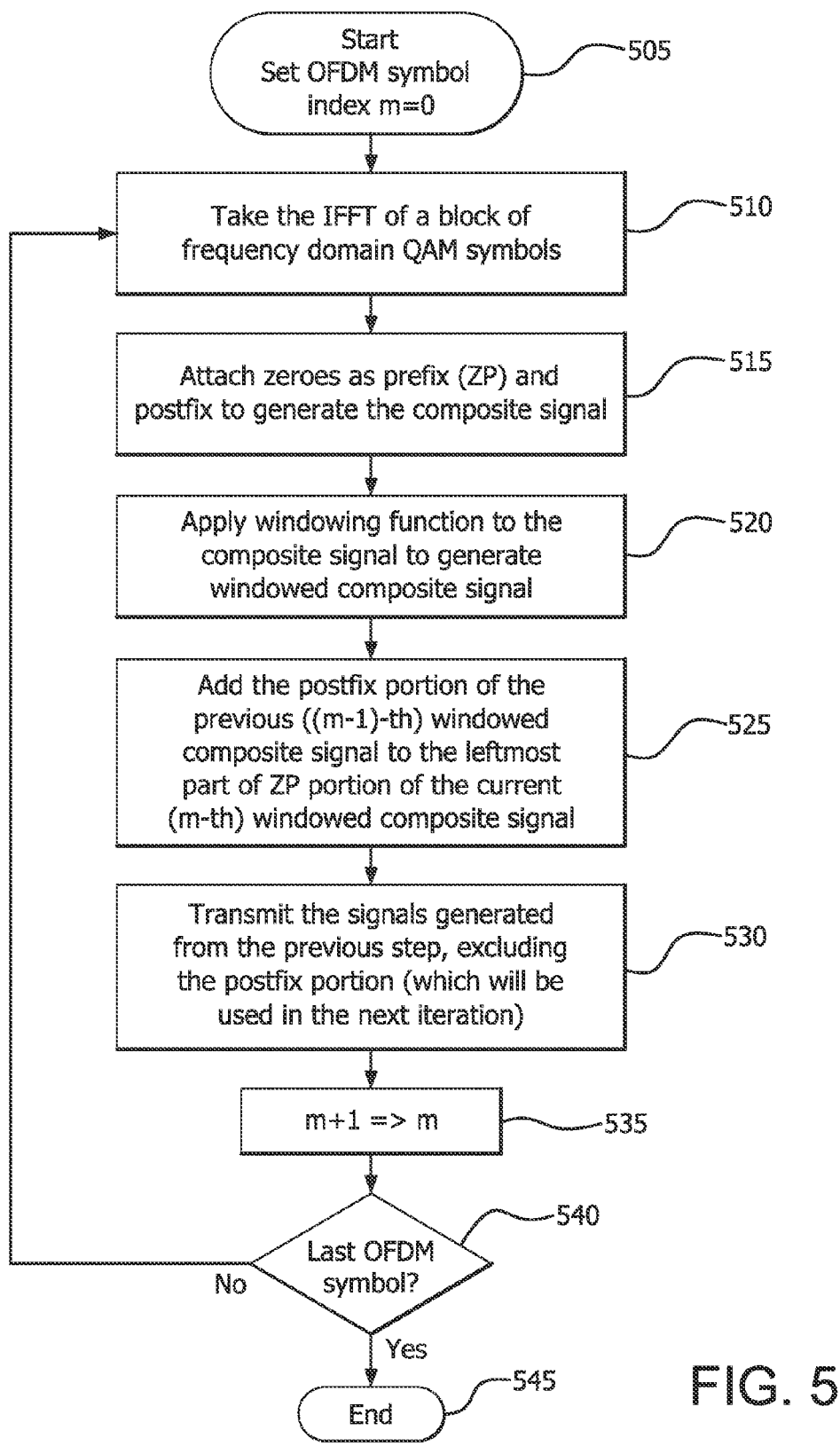
FIG. 5 is a flow chart of an example transmitter windowing procedure with zero-padding.

A transmitter side windowing method and apparatus using zero-padding (ZP) OFDM instead of CP will now be described. FIG. 5 is a flow chart of an example transmitter windowing procedure with zero-padding. Referring to FIG. 5, the OFDM symbol index is set to m=0 in step 505, Next, the transmitter takes the IFFT of a block of frequency domain QAM symbols. For example, if the IFFT size is N=8, then the samples at the output of IFFT for the $m^{th}$ OFDM symbol is $a^{(m)}=[a_1^{(m)},a_2^{(m)},a_3^{(m)},a_4^{(m)}a_5^{(m)},a_6^{(m)},a_7^{(m)},a_8^{(m)}]$. In step 515, a zero prefix (ZP) and postfix are attached to generate the composite signal. For example, if the zero padding length is 4 and the postfix length is 2, then after ZP and the postfix are appended, the composite signal becomes $s^{(m)}=[0, 0, 0, 0, a_1^{(m)}, a_2^{(m)},a_3^{(m)},a_4^{(m)},a_5^{(m)},a_6^{(m)},a_7^{(m)},a_8^{(m)},a_1^{(m)}a_2^{(m)}]$ In step 520, the windowing function is applied to the composite signal to generate a windowed composite signal. In the above example, since the first 4 samples are zero, the first 4 samples of the windowing function are also zero. For example, if "$\beta N_T$"=2, that is, windowing takes 2 samples on each side to ramp up and down, then
$s_w^{(m)}=[0, 0, 0, 0, p_{11}a_1^{(m)},p_{12}a_2^{(m)},a_3^{(m)},a_4^{(m)},a_5^{(m)},a_6^{(m)},a_7^{(m)},a_8^{(m)},p_{13}a_1^{(m)},p_{13}a_2^{(m)}]$ where $0=p_1<p_2<1$, and $0=p_{14}<p_{13}<1$. In step 525, the postfix portion of the previous $(m-1)^{th}$ windowed composite signal is added to the leftmost part of the ZP portion of the current $m^{th}$ windowed composite signal. In step 530, the signals generated from step 525 are transmitted, excluding the postfix portion, which will be used in the next iteration. The transmitted samples for the $m^{th}$ symbol is $s_{w\text{-}TX}^{(m)}=[p_2a_1^{(m-1)},p_1a_2^{(m-1)}, 0, 0, a_1^{(m)},a_2^{(m)},a_3^{(m)},a_4^{(m)},a_5^{(m)},a_6^{(m)},a_7^{(m)},a_8^{(m)}]$. The step 535, the OFDM symbol index is increased by 1, m+1=>m, to apply the process to the next consecutive symbol. If m+1 is not the last symbol, steps 510-540 are repeated for the next consecutive symbol. If m+1 is the last OFDM symbol, then the method is complete in step 545.

Figure 6:
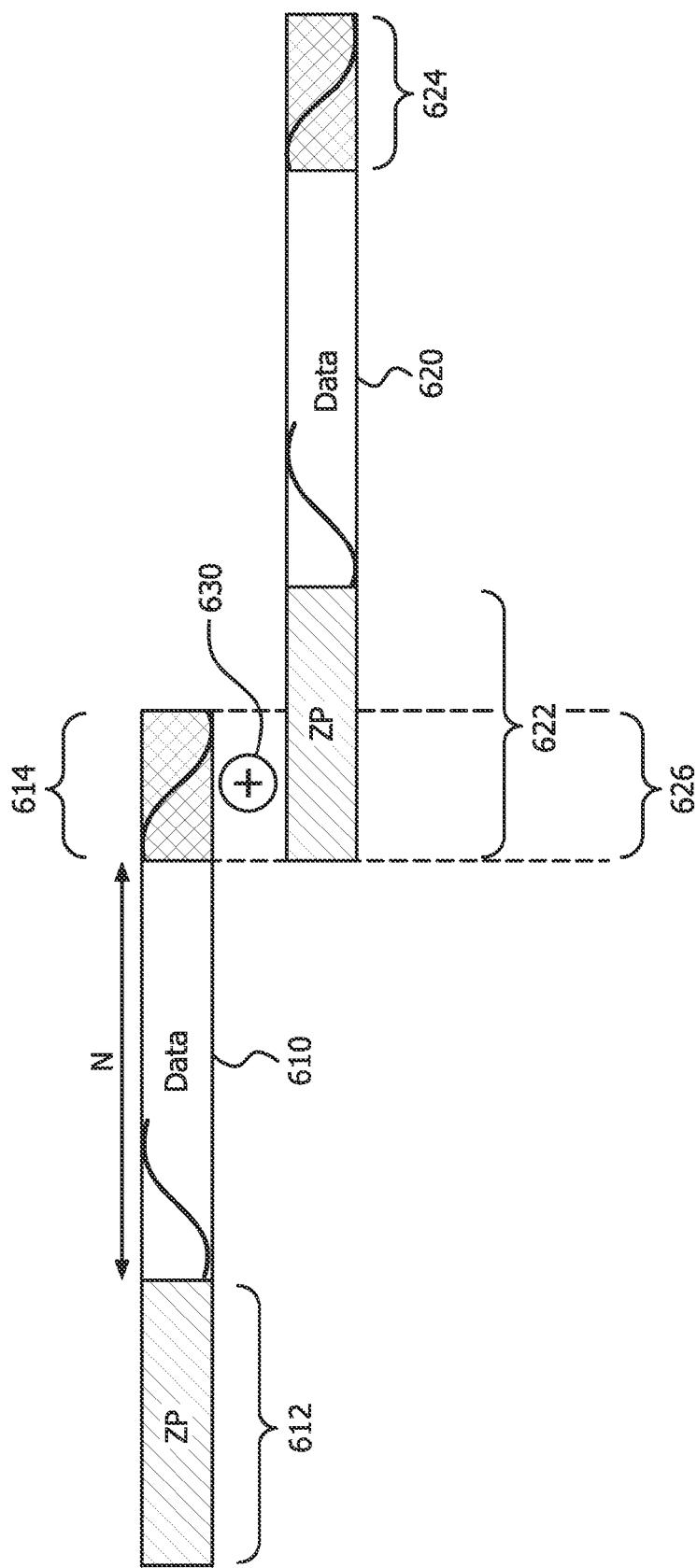
FIG. 6 is a diagram of an example application of transmit windowing with zero-padding in accordance with the method described in FIG. 5.

FIG. 6 is a diagram of an example application of transmit windowing with zero-padding in accordance with the method described in FIG. 5. It should be noted that for purposes of illustration and for the reader's convenience, only two data blocks are shown. It should be noted that there may be any number of data blocks before and after the data blocks shown in FIG. 6. As described in FIG. 5, the method may continue until the last data block in the signal is processed. Referring to FIG. 6, a first data block 610 and a second data block 620 are shown. The first data block 610 has a ZP 612 consisting of zeros prepended to the beginning of the data block 610 and a postfix 614 appended to the end of the data block 610. The leftmost part of the data block 610 and the postfix 614 have been windowed. Similarly, the second data block 620 has a ZP 622 consisting of zeros prepended to the beginning of the data block 620 and a postfix 624 appended to the end of the data block 620. The leftmost part of the data block 620 and the postfix 624 have been windowed. It is important to note that windowing is applied independently on each of the data blocks 610, 620. The overlapping segment of the windowed postfix 614 of the first data block 610 and the foremost portion 626 of the ZP 622 of the second data block 620 are effectively summed 630.

Figure 7:
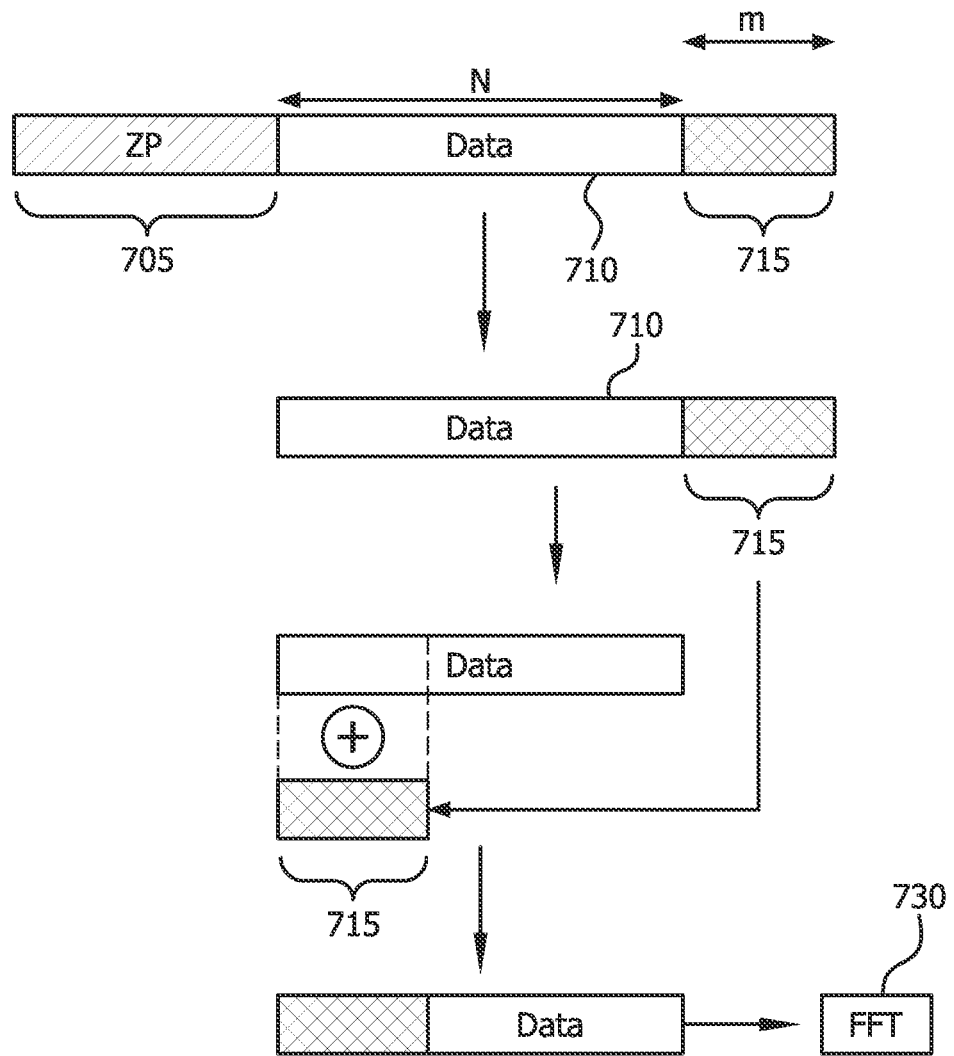
FIG. 7 is an example diagram of receiver side procedures for windowing with zero-padding.

FIG. 7 is an example diagram of receiver side procedures for windowing with zero-padding. At the receiver, the signal is restored by overlapping and adding the postfix 715 to the first m samples of the received data block 710. Referring to FIG. 7, a block of data 710 with a prepended ZP 705 and an appended postfix 715 is received at a receiver. The ZP 705 is discarded, leaving the data block 710 and the postfix 715. The postfix 715 is removed from the tail of the data block 710 and added to the head of the data block 710. The output is then sent to the FFT block 730 which converts the data block in the sub-carriers from the time domain back to the frequency domain.

A method and apparatus for applying different window functions to separate groups of a data signal will now be described. Different windowing functions may be applied to different sub-bands of the transmission band. As an example, the sub-bands next to the edges may be shaped with longer windows to get better spectral containment of those sub-bands. On the other hand, the sub-bands away from the edges, or in the middle of the band, may be shaped with shorter windows. Since windowing may introduce distortion, the possibly larger distortion introduced by the longer windows will be limited to the sub-bands on the edges.

Figure 8:
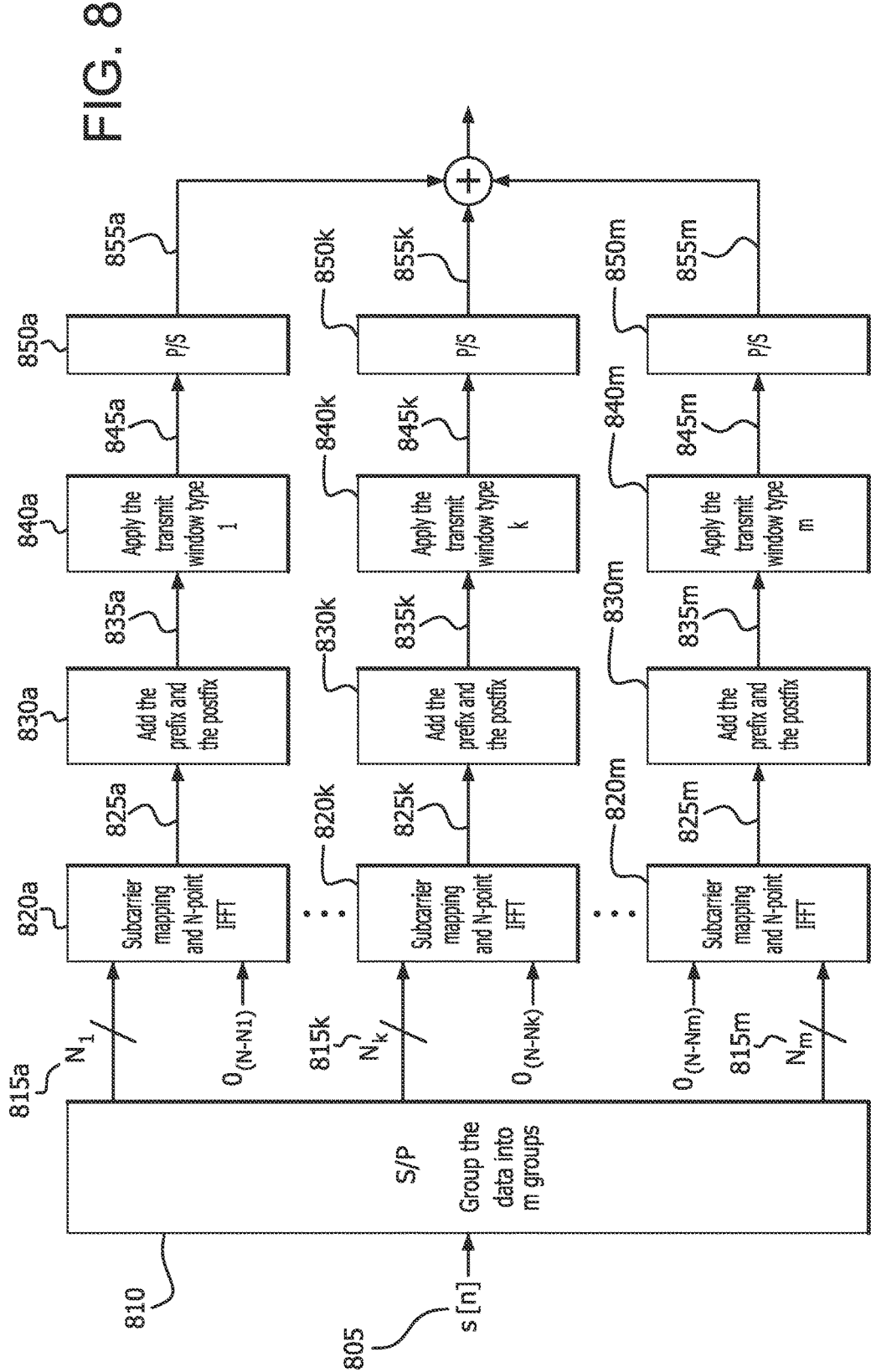
FIG. 8 is a diagram of an example method of applying different windowing functions to different sub-bands of the transmission band.

FIG. 8 is a diagram of an example method of applying different windowing functions to different sub-bands of the transmission band. In FIG. 8, the subcarriers in each sub-band are shown to be contiguous. This is for illustration purposes only, and in general, a sub-band may consist of contiguous or non-contiguous group(s) of subcarriers. The sub-bands are non-overlapping, i.e., subcarriers in a sub-band are different than the sub-carriers in the other sub-bands.

Referring to FIG. 8, incoming modulated symbols s[n] 805 are input into a serial-to-parallel converter (S/P) 810 which outputs m groups of modulated output signals, 815*a-m* to be divided among a plurality of subcarriers. For purpose of explanation, it is assumed that m different windowing functions will be applied to m different sub-bands. For each sub-band, the modulated output signals 815*a-m* are mapped to the plurality of subcarriers in the IFFT blocks 820*a-m* corresponding to the subcarriers in those sub-bands. Note that FIG. 8 shows multiple IFFT blocks. This is to show that conceptually, m IFFTs are taken. However, in a hardware implementation there may be one IFFT block that may be used m times. This is also the case for the other units shown in the diagram. Let $\mathcal{N}_i$ denote the set of indices of subcarriers in the i'th sub-band where each element of $N_i \in \{0, 1, \ldots, N-1\}$. Let the input to the IFFT be a N×1 vector of zeros. The group of modulated symbols that are to be transmitted on subcarriers $\mathcal{N}_i$ are inserted into the elements of the vector where the indices of the elements are $\mathcal{N}_i$. For each sub-band, the IFFT output 825*a-m* is padded with a prefix and a postfix at the padding attacher module 830*a-m*. The output 835*a-m* of each padding attacher module 830*a-m* is point-wise multiplied with the appropriate windowing function at the respective window filters 840*a-m*. As shown in FIG. 8, a different windowing function may be used in each branch (i.e., window type 1, window type k, window type, etc.). However, the length of the signal in each branch should be equal. Therefore, the size of the prefix and postfix in each branch is the same. After the windowing function is applied, the output of each windowed signal 845*a-m* is input into a parallel-to-serial converter (P/S) 850*a-m*. The output of each branch 855*a-m* is then added together to create the composite signal that will be transmitted.

Methods and apparatus for receiver side windowing will now be described. A mechanism may be used at the receiver to reject the adjacent channel interference leakage. Such a mechanism is used because even if the interfering signal in the adjacent band has low out-of-band emission, the spectral leakage from the interfering signal increases after the CP removal. Therefore, before the CP is removed, the received signal may be filtered. OFDM achieves this by using the rectangular windowing, which corresponds to a sinc-type filter with high tails, and is therefore not satisfactory for interference rejection capability.

Similar to the transmitter side filtering, receive filtering imposes challenges in a fragmented spectrum. An alternative method is to use windowing at the receiver. In general, if the transmitter attaches a prefix and postfix as illustrated in FIG. 3, receive windowing may be applied to the prefix, data, and postfix samples.

One way the receive window may be defined is as follows:

$$p[n] = \begin{cases} 0.5(1 + \cos\{\pi(1 + \frac{n}{\beta N_T})\}) & \alpha \le n < \beta N_T \\ 1 & \beta N_T \le n < N_T - \beta N_T \\ 0.5(1 + \cos\{\pi \frac{n - (\beta + 1)N_T}{\beta N_T}\}) & N_T - \beta N_T \le n \le N_T \end{cases} \quad \text{Equation (15)}$$

In general, the receive window may be defined beyond $N_T$. However, this may call for the next symbol to be used, causing a small delay. The following approach will hold regardless.

Figure 9:
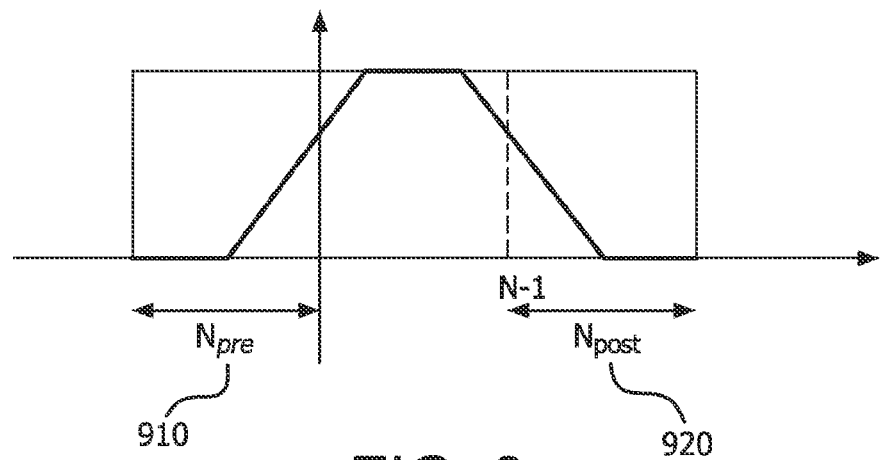
FIG. 9 is an example diagram of the boundaries of receive windowing.

FIG. 9 is an example diagram of the boundaries of receive windowing. Referring to FIG. 9, $N_{pre}$ 910 is the length of the prefix. $N_{post}$ 920 is the length of the postfix. Note that the boundaries shown for the window in FIG. 9 are just one example, and it should be noted that the window non-zero window coefficients boundaries may extend from $-N_{pre}$ to $N_{post}$.

In the case of no transmit windowing, i.e., all 1's, and no overlapping between consecutive symbols, the transmitted symbol may be written as $$x[n] = \sum_{k=0}^{M-1} \sum_{\ell=-\infty}^{\infty} S_k[\ell] p[n - \ell\lambda] e^{\frac{j2\pi k(n - l\lambda)}{N}}, \quad \text{Equation (16)}$$

where $\lambda = N + N_{pre} + N_{post}$. For $n = l\lambda - N_{pre}, \ldots, l\lambda + (N + N_{post} - 1)$, $$x[n] = \sum_{k=0}^{M-1} S_k[\ell] e^{\frac{j2\pi k(n-\ell\lambda)}{N}}$$

where the $N_{pref}$ may include the guard interval for the CP as well. Let $n=l\lambda+m$ for $l=-\infty, \ldots, 0, \ldots, \infty$, $m=-N_{pre}, \ldots, N+N_{post}$. Then, $$x^\ell[m] = \qquad \text{Equation (17)}$$

$$x[\ell\lambda+m] = \sum_{k=0}^{M-1} S_k[\ell] e^{\frac{j2\pi k(\ell\lambda+m-\ell\lambda)}{N}} = \sum_{k=0}^{M-1} S_k[\ell] e^{\frac{j2\pi k(m)}{N}}.$$

The receiver windowing coefficients may be defined as: $\{w[m], m=-N_{pre}, \ldots, N+N_{post}\}$. Applying windowing and converting the received signal back to the frequency domain by FFT, i.e., frequency demodulation at frequency $k/N$, $$\sum_{m=-N_{pre}}^{N+N_{post}-1} x^\ell[m]w[m]e^{-\frac{j2\pi mk}{N}} = \sum_{m=-N_{pre}}^{-1} x^\ell[m]w[m]e^{-\frac{j2\pi mk}{N}} + \qquad \text{Equation (18)}$$

$$\sum_{m=0}^{N-1} x^\ell[m]w[m]e^{-\frac{j2\pi mk}{N}} + \sum_{m=N}^{N+N_{post}-1} x^\ell[m]w[m]e^{-\frac{j2\pi mk}{N}}$$

If m' is defined as follows, $m'=N+m$ for $m=N_{pre}, \ldots, 1$, then, the terms in Equation 18 may be written as follows:

$$\text{The first term} = \sum_{m'=N-N_{pre}}^{N-1} x^\ell[m'-N]w[m'-N]e^{-\frac{j2\pi m'k}{N}} \qquad \text{Equation (19)}$$

Expanding $w[m]$ such that $w[m]=0$ for $m=-N, \ldots, -N_{prep}-1$. Then the first term becomes:

$$\text{The first term} = \sum_{m'=0}^{N-1} x^\ell[m'-N]w[m'-N]e^{-\frac{j2\pi m'k}{N}} \qquad \text{Equation (20)}$$

Define $m''=m-N$ for $m=N, \ldots, N+N_{post}$ $$\text{The last term} = \sum_{m''=0}^{N_{post}-1} x^\ell[m''+N]w[m''+N]e^{-\frac{j2\pi m''k}{N}} \qquad \text{Equation (21)}$$

Expanding $w[m]$ such that $w[m]=0$ for $m=N+N_{post}, \ldots, 2N$. Then, $$\text{The last term} = \sum_{m''=0}^{N-1} x^\ell[m''+N]w[m''+N]e^{-\frac{j2\pi m''k}{N}} \qquad \text{Equation (22)}$$

Combining the terms, gives $$\sum_{m=-N_{pre}}^{N+N_{post}-1} x^\ell[m]w[m]e^{-\frac{j2\pi mk}{N}} = \qquad \text{Equation (23)}$$

$$\sum_{m=0}^{N-1}\sum_{i=-1}^{1} x^\ell[m+iN]w[m+iN]e^{-\frac{j2\pi mk}{N}}.$$

To recover the transmitted symbols, make $x^l[m]=x^l[m-N]$ for $m=N-N_{pre}, \ldots, N-1$ and $x^l[m]=x^l[m+N]$ for $m=0, \ldots, N_{post}-1$.

The transmitted signal may be considered as $$x[n] = \sum_{k=0}^{N-1} \sum_{l=-\infty}^{\infty} S_k[\ell]p[n-\ell\lambda] e^{\frac{j2\pi k(n-\ell\lambda)}{N}} \qquad \text{Equation (24)}$$

where $\lambda=N+N_{post}+N_{pre}$. Assuming that $p[n]\neq 0$ for $n=-N_{pre}, \ldots, N+N_{post}$, define $m=n-l\lambda$. Then, taking $\lambda$ samples from $x[n]$:

$$x^\ell[m] = x[m+\ell\lambda] = \sum_{k=0}^{N-1} S_k[\ell]p[m]e^{\frac{j2\pi k(m)}{N}} = \qquad \text{Equation (25)}$$

$$p[m]\sum_{k=0}^{N-1} S_k[\ell]e^{\frac{j2\pi k(m)}{N}} = p[m]y[m]$$

For $m=-N_{pre}, \ldots, N+N_{post}$. Note that $y[m]=y[m-N]$ for $m=N-N_{pre}, \ldots, N-1$ and $y[m]=y[m+N]$ for $m=0, \ldots, N_{post}-1$. At the receiver side, the transmitter window $p[m]$ should be chosen such that $x^l[m]=p[m]y[m]$ also satisfies this condition.

Applying the transmitted signal at the receiver side, $$\sum_{m=0}^{N-1}\sum_{i=-1}^{1} x^\ell[m+iN]w[m+iN]e^{-\frac{j2\pi mk'}{N}} = \qquad \text{Equation (26)}$$

$$\sum_{m=0}^{N-1}\sum_{i=-1}^{1}\left(p[m+iN]\sum_{k=0}^{N-1} S_k[\ell]e^{\frac{j2\pi k(m+iN)}{N}}\right) w[m+iN]e^{-\frac{j2\pi mk'}{N}} =$$

$$\sum_{m=0}^{N-1}\left(\sum_{i=-1}^{1} p[m+iN]w[m+iN]\right)\sum_{k=0}^{N-1} S_k[\ell]e^{\frac{j2\pi m(k-k')}{N}}$$

If $$\Sigma_{i=-1}^{1} p[m+iN]w[m+iN]=1, \qquad \text{Equation (27)}$$

or a constant, for $m=0, \ldots, N-1$, the above expression is $S_{k'}[l]$.

Figure 10:
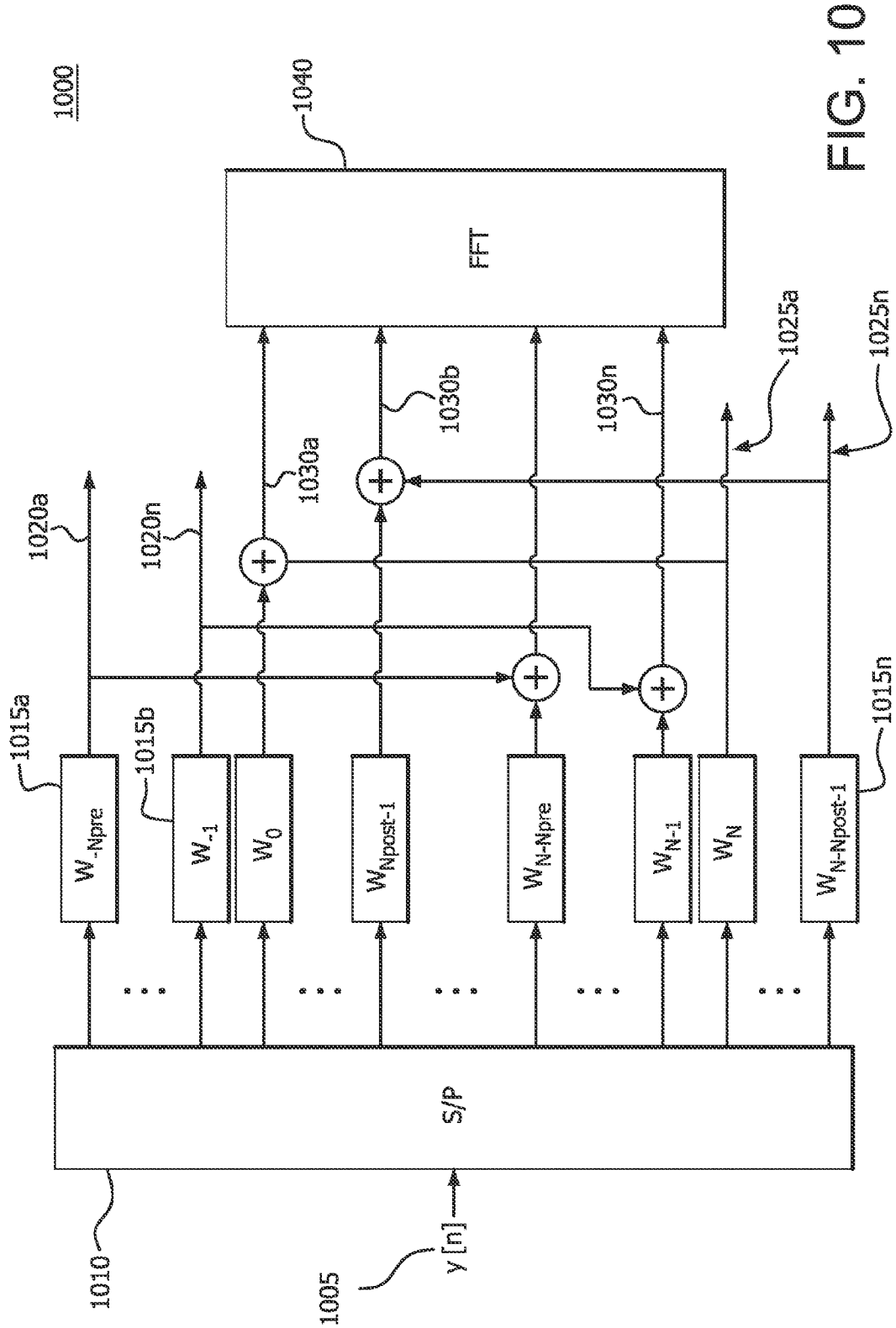
FIG. 10 is a block diagram of a receiver module configured to implement an example type of receive windowing.

FIG. 10 is a block diagram of a receiver module 1000 configured to implement an example type of receive windowing. Referring to FIG. 10, the receiver may receive an OFDM signal $y[n]$ 1005. A serial-to-parallel converter (S/P) 1010 samples the received signal $y[n]$ 1005, which may include a data block spread across a plurality of sub-carriers of a frequency band, and divides it into a plurality of sub-carriers. Receive windowing may be applied at window filters 1015a-n. The prefix samples 1020a-n and the postfix samples 1025a-n may be added to the data block 1030a-n and then removed. It should be noted that receive windowing may be applied to the prefix, datablock, and postfix samples, before the prefix and postfix are removed. The datablock 1030a-n is input into an FFT unit 1040, which may be an N-point FFT unit, that converts the datablock in the sub-carriers from the time domain back to the frequency domain.

As an alternative method, the received signal on subcarrier $\hat{k}$ after windowing and taking the FFT may be written as $$S^{f}[\hat{k}] = \sum_{k=0}^{N-1} \sum_{n=-N_{pre}}^{N+N_{post}-1} S_k[\ell] p[n] w[n] e^{j2\pi k \frac{1}{N} n} e^{-j2\pi \hat{k} \frac{1}{N} n} \quad \text{Equation (28)}$$

where the receive window is denoted as w[n].

Defining n=iN+m, and ignoring p[n] because it is all 1's, Equation 29 is obtained using only i=−1, 0, 1 because of the extent of the window.

$$S^{f}[\hat{k}] = \sum_{k=0}^{N-1} \sum_{m=0}^{N-1} \sum_{i=-1}^{1} S_k[\ell] w[iN+m] e^{j2\pi(k-\hat{k})\frac{1}{N}(iN+m)} \quad \text{Equation (29)}$$

From Equation 29, it can be seen that, to ensure orthogonality, $\Sigma_{i=-1}^{1} w[iN+m]$=constant. Under this condition, orthogonality is preserved, and $$S^{f}[\hat{k}] = \Sigma_{k=0}^{N-1} \Sigma_{m=0}^{N-1} S_k[\ell] e^{j2\pi(k-\hat{k})m} \quad \text{Equation (30)}$$

Note that, similar to adding the CP in Equation 8, the extension of the OFDM signal over duration N is equal to taking the IFFT and adding the first samples as postfix.

From Equation (29), $$S^{f}[\hat{k}] = \sum_{i=-1}^{1} \sum_{m=0}^{N-1} w[iN+m] \sum_{k=0}^{N-1} S_k[\ell] e^{j2\pi(k-\hat{k})\frac{1}{N}m} \quad \text{Equation (31)}$$

Figure 11:
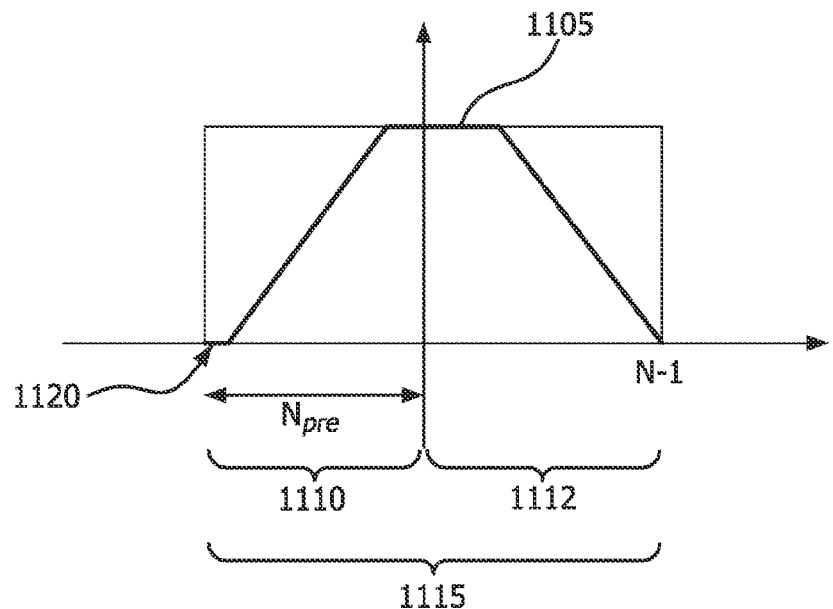
FIG. 11 is a diagram of an example windowing interval in a practical system.
Figure 12:
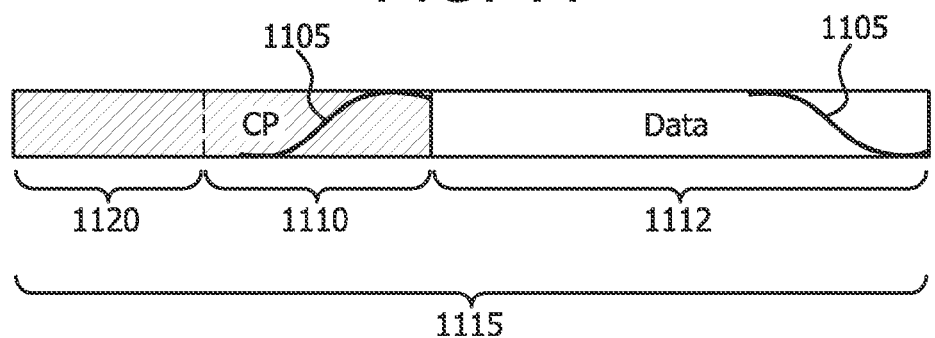
FIG. 12 is a diagram of an example windowing interval in a practical system.

The above window is the most general case. In practical systems, by way of example, the postfix of one symbol serves as the prefix of the next symbol. Therefore, applying windowing to the postfix introduces additional ISI from the following symbol and increases latency. FIGS. 11 and 12 are diagrams of an example windowing interval in a practical system. Referring to FIG. 11, the windowing interval 1105 covers the samples of the current symbol 1115, including the data part 1112 and the cyclic prefix part 1110. Additionally, the window interval 1105 may cover samples of the extended guard interval parts 1120, if it exists. Similarly, this may be seen in FIG. 12. Note that, from a system perspective, an extended guard interval may be assumed as part of the cyclic prefix.

For this case, $$S^{f}[\hat{k}] = \sum_{k=0}^{N-1} \sum_{m=0}^{N-1} \sum_{i=-1}^{0} S_k[\ell] w[iN+m] e^{j2\pi(k-\hat{k})\frac{1}{N}(iN+m)}. \quad \text{(Equation 32)}$$

For orthogonality, $\Sigma_{i=-1}^{0} w[iN+m]$=constant.

With transmit windowing, it can be shown that to maintain orthogonality, $$\Sigma_{i=-1}^{0} w[iN+m] p[m+iN] = \text{constant}. \quad \text{Equation (33)}$$

Figure 13:
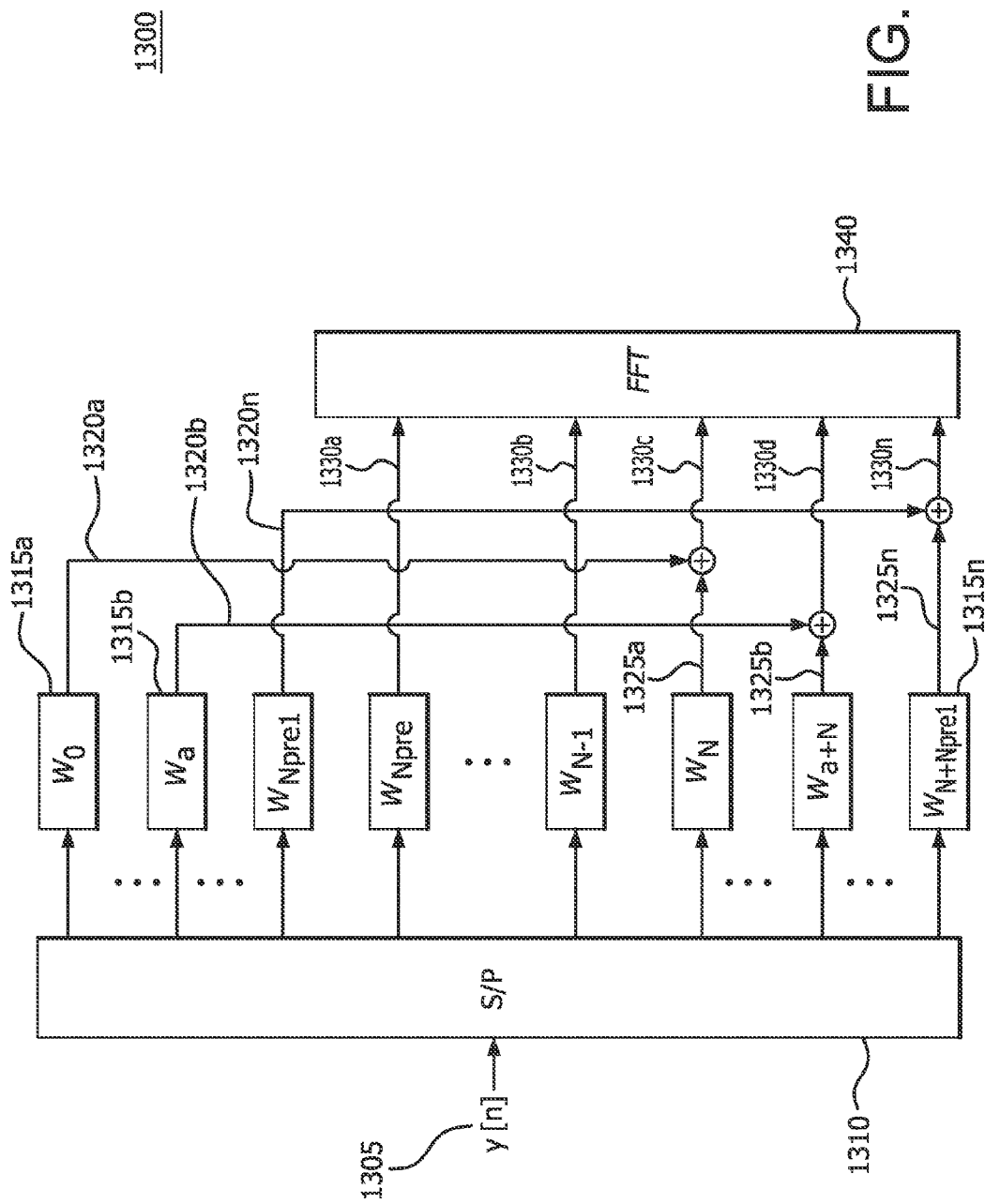
FIG. 13 is a diagram of a receiver module configured to implement an example type of receive windowing by point-wise multiplying.

Receive windowing may also be implemented by point-wise multiplying the input received block by the receiver windowing coefficients. FIG. 13 is a diagram of a receiver module 1300 configured to implement an example type of receive windowing by point-wise multiplying. Referring to FIG. 13, the receiver may receive an OFDM signal y[n] 1305. A serial-to-parallel converter (S/P) 1310 samples the received signal y[n] 1305, which may include a data block spread across a plurality of sub-carriers of a frequency band, and divides it into a plurality of subcarriers. Receive windowing is applied by point-wise multiplying the data block by the receiver windowing coefficients at window filters 1315a-n. The first samples 1320a-n are added to the corresponding last samples 1325a-n. The first samples 1320a-n are then removed. The first samples 1320a-n may also be referred to as guard interval. Then, the data block 1330a-n is input into an FFT unit 1340, which may be an N-point FFT unit that converts the datablock in the sub-carriers from the time domain back to the frequency domain.

Equations (27) and (33) specify the conditions to maintain orthogonality at the receiver when both transmit and receive windowing are applied. Given a transmit window function, the receiver window function may be computed from these equations.

Intersymbol interference due to receive windowing will now be described. The following analysis assumes that the second type of receive windowing, as described in FIG. 11 and Equations (28)-(33), is used since it is more appropriate from a system design point of view.

Assume that the transmitted signal goes through a channel denoted as h[n]. The received signal, after windowing, may be written as $$S^{f}[\hat{k}] = \Sigma_{i=-1}^{0} \Sigma_{m=0}^{N-1} w[iN+m] r[iN+m] e^{-j2\pi \hat{k} F_0 m} \quad \text{Equation (34)}$$

where $r[n]=x[n]*h[n]=\Sigma_{u=0}^{L-1} x(n-u) h(u)$ Then, $$S^{f}[\hat{k}] = \Sigma_{i=-1}^{0} \Sigma_{m=0}^{N-1} w[iN+m] \Sigma_{u=0}^{L-1} x(iN+m-u) h(u) e^{-j2\pi \hat{k} F_0 m}. \quad \text{Equation (35)}$$

Note that, the prefix part of the data block may contain interference from the previous data block. This interference is multiplied by the window function and added to the desired signal as shown in Equation (23). The level of interference may depend on the channel delay spread and the length of the window function. If the zero-part of the window function is long enough to absorb the ISI, interference may not occur since the prefix is discarded. However, if the delay spread is long enough, then interference may occur. Assuming that the channel delay spread L<N, then ISI is due to only the previous data block. In this case, interference contributes from i=−1, due to data transmitted in i=−2. Then, the interference on the k'th subcarrier may be written as $$S^{f}[\hat{k}] = \Sigma_{m=0}^{N-1} w[iN+m] \Sigma_{u=0}^{L-1} x(iN+m-u) v(iN+m-u) h(u) e^{-j2\pi \hat{k} F_0 m}, \ i=-1, \quad \text{Equation (36)}$$

where v(iN+m−u)=1 for iN+m−u<−N, else 0.

$$S^{f}[\hat{k}] = \sum_{m=0}^{N-1} \sum_{u=0}^{L-1} w[iN+m] \times (iN+m-u) \\ v(iN+m-u) h(u) e^{-j2\pi \hat{k} F_0 m}, \ i=-1 \quad \text{Equation (37)}$$

From here, the interference power may be computed. Matrix notation may be used to see the ISI more clearly. The transmitted signal may be written as $$x_l = \begin{bmatrix} 0_{\beta \times (N-\beta)} & I_\beta \\ I_N \end{bmatrix} F^H S_l, \qquad \text{Equation (38)}$$

where $F^H$ is the IFFT matrix and $$\begin{bmatrix} 0_{\beta \times (N-\beta)} & I_\beta \\ I_N \end{bmatrix}$$

appends a prefix of $\beta$ samples. The received signal after the channel is $$y_l = H_{signal} \begin{bmatrix} 0_{\beta \times (N-\beta)} & I_\beta \\ I_N \end{bmatrix} F^H S_l + \qquad \text{Equation (39)}$$

$$H_{isi} \begin{bmatrix} 0_{\beta \times (N-\beta)} & I_\beta \\ I_N \end{bmatrix} F^H S_{l-1} + n$$

where the first part of Equation (27) is the desired signal, the second part of Equation (27) is the ISI from the previous block, and the third part of Equation (27) is the noise. The channel matrices in Equation (27) may be written as $$H_{signal} = \begin{bmatrix} h_0 & 0 & \cdots & \cdots & 0 \\ \vdots & \ddots & \ddots & \ddots & \vdots \\ h_{L-1} & \cdots & h_0 & 0 & \ddots & \vdots \\ 0 & h_{L-1} & \cdots & h_0 & \ddots & 0 \\ \vdots & \ddots & \ddots & \vdots & \ddots & 0 \\ 0 & \cdots & 0 & h_{L-1} & \cdots & h_0 \end{bmatrix}, \qquad \text{Equation (40)}$$

$$H_{isi} = \begin{bmatrix} 0 & \square & 0 & h_{L-1} & \cdots & h_1 \\ \vdots & \ddots & \ddots & \ddots & \ddots & \vdots \\ \vdots & \ddots & \ddots & \ddots & 0 & h_{L-1} \\ \vdots & \ddots & \ddots & \ddots & \ddots & 0 \\ \vdots & \ddots & \ddots & \ddots & \ddots & \vdots \\ 0 & \cdots & \cdots & \cdots & \cdots & 0 \end{bmatrix}$$

After applying the windowing to the received signal, $$r = \begin{bmatrix} I_{\beta \times \beta} & 0_{\beta \times N} & 0_{\beta \times \beta} \\ 0_{N \times \beta} & I_{N \times N} & 0_{N \times \beta} \\ I_{\beta \times \beta} & 0_{\beta \times N} & I_{\beta \times \beta} \end{bmatrix} W y_l, \qquad \text{Equation (41)}$$

where W performs the windowing operation and is defined as follows:

$$W = \mathrm{diag}[w_{-\beta} \ldots w_1 1\,1\,1\,1\,1 \ldots w_{N-\beta} \ldots w_{N-1}]$$

$$w_{-m} + w_{N-m} = 1$$

and $$\begin{bmatrix} I_{\beta \times \beta} & 0_{\beta \times N} & 0_{\beta \times \beta} \\ 0_{N \times \beta} & I_{N \times N} & 0_{N \times \beta} \\ I_{\beta \times \beta} & 0_{\beta \times N} & I_{\beta \times \beta} \end{bmatrix}$$

and takes the first $\beta$ values of the processed data block and adds to the last $\beta$ values. These two matrices together perform the receive windowing. Equation 29 may be rewritten as $$r = \begin{bmatrix} I_{\beta \times \beta} & 0_{\beta \times N} & 0_{\beta \times \beta} \\ 0_{N \times \beta} & I_{N \times N} & 0_{N \times \beta} \\ I_{\beta \times \beta} & 0_{\beta \times N} & I_{\beta \times \beta} \end{bmatrix} W \left\{ H_{signal} \begin{bmatrix} 0_{\beta \times (N-\beta)} & I_\beta \\ I_N \end{bmatrix} F^H S_l + \right. \qquad \text{Equation (42)}$$

$$\left. H_{isi} \begin{bmatrix} 0_{\beta \times (N-\beta)} & I_\beta \\ I_N \end{bmatrix} F^H S_{l-1} + n \right\}.$$

After the removal of the guard band, the signal part preserves the orthogonality. However, ISI from the previous block is introduced. The amount of the ISI depends on L and $\beta$. The effect of ISI may be more clearly seen in the following:

$$g = \begin{bmatrix} 0 & \cdots & 0 & h_{L-1} & \cdots & h_1 \\ \vdots & \ddots & \ddots & \ddots & \ddots & \vdots \\ \vdots & \ddots & \ddots & \ddots & 0 & h_{L-1} \\ \vdots & \ddots & \ddots & \ddots & \ddots & 0 \\ \vdots & \ddots & \ddots & \ddots & \ddots & \vdots \\ 0 & \cdots & \cdots & \cdots & \cdots & 0 \end{bmatrix} \begin{bmatrix} 0_{\beta \times (N-\beta)} & I_\beta \\ I_N \end{bmatrix} F^H S_{l-1}. \qquad \text{Equation (43)}$$

The ISI introduced will be $F y_{isi}$, where $$y_{isi} = [0\ 0\ 0\ 0\ \ldots\ w_{-\beta}g(0)\ \ldots\ w_{-1}g(\beta-1)]^T. \qquad \text{Equation (44)}$$

The samples multiplied by the window's 0-coefficients will not contribute to the ISI. If $w_{-\beta+a}$ is the first non-zero sample of the window, then ISI contribution will be zero if $\alpha \geq L$.

Methods to improve performance of receive windowing, such as interference cancellation will now be described. Successive interference cancellation will now be described. The received signal may contain interference from the previous transmitted block due to the multi-path channel. Equation (44) characterizes the interference in terms of the channel, the previous block, and the receive windowing coefficients. After windowing, depending on the CP length and the windowing coefficients, some of this interference is added to the time samples of the current symbol. One method to improve the performance is to regenerate and cancel this interference. Assuming that the channel is known and the previous symbol has been demodulated, the interference may be regenerated and subtracted from the current symbol. The subtraction may be done either in the time domain or the frequency domain.

If the transmitted signal was also windowed, then even without multi-path channel, the receive windowing introduces ISI.

Figure 14:
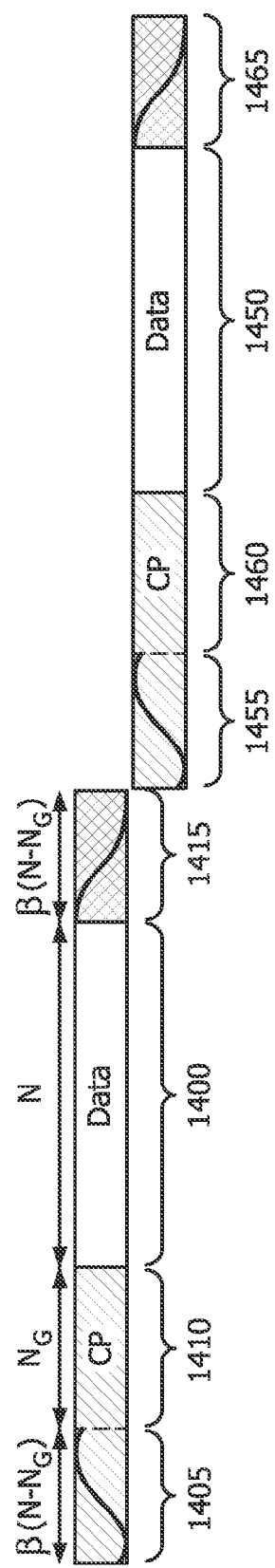
FIG. 14 is an example case of transmit windowing.
Figure 15:
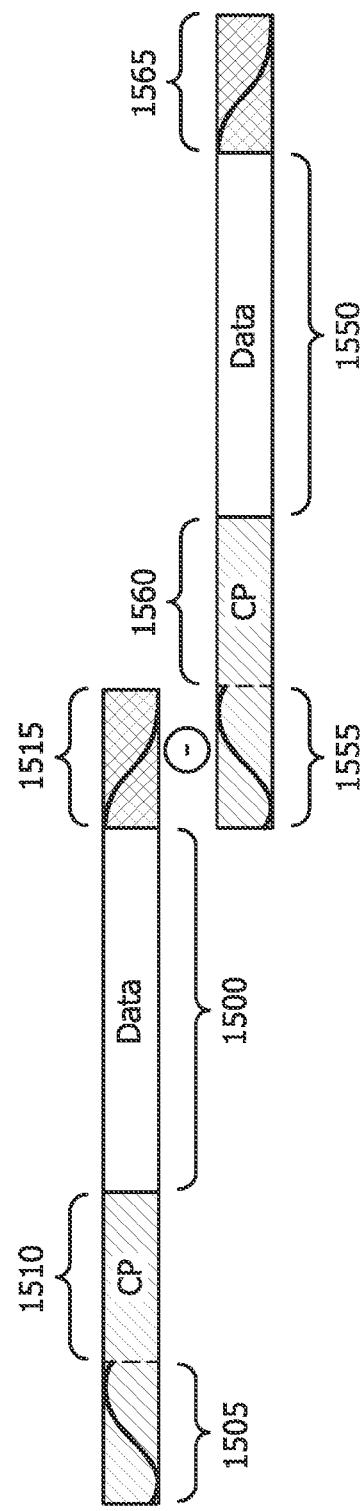
FIG. 15 is an example case of transmit windowing.
Figure 16:
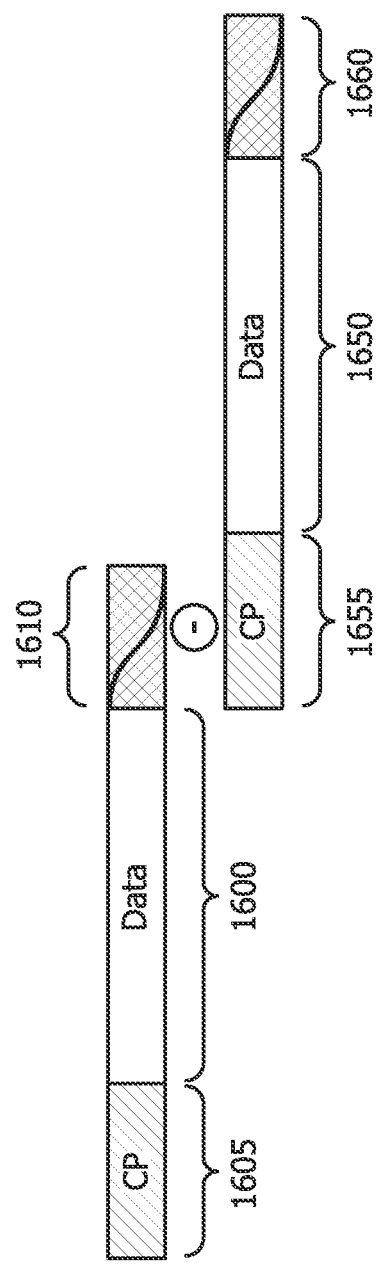
FIG. 16 is an example case of transmit windowing.

FIGS. 14, 15 and 16 show various cases of transmit windowing. Referring to FIG. 14, a first block of data 1400 and a second block of data 1450 are shown. Extended guard intervals, in the form of a prefixes 1405, 1455, and postfixes 1415, 1465 are appended to each respective block of data 1400, 1450. The prefixes 1405, 1455 are appended to the CP 1410, 1460 of each respective block of data 1400, 1450. The postfixes 1415, 1465 are appended to the tail of each respective block of data 1400, 1450. The extended guard intervals are appended in order to perform transmit windowing. At the receiver side, after receive windowing, the CP and extended guard intervals are discarded. The receive window may be applied on the CPs and the extended guard intervals. In this case, the interference depends on the channel length and the receive window coefficients as shown in the above analysis. The difference would be that the interfering samples from the previous block are now weighted by the transmit window coefficients.

Referring to FIG. 15, a first block of data 1500 and a second block of data 1550 are shown. Extended guard intervals, in the form of prefixes 1505, 1555 and postfixes 1515, 1565 are appended to each respective block of data 1500, 1550. The prefixes 1505, 1555 are appended to the CP 1510, 1560 of each respective block of data 1500, 1550. The postfixes 1515, 1565 are appended to the tail of each respective block of data 1500, 1550. The extended guard intervals, i.e., prefixes, are appended in order to perform transmit windowing. In this case, the extended guard intervals, i.e. the postfix 1515 of the first block of data 1500 and the prefix 1555 of the second block of data 1550, of consecutive symbols overlap to reduce spectral loss. At the receiver side, after receive windowing, the CP and extended guard intervals are discarded. As in the case shown in FIG. 14, the receive window may be applied on the CPs and the extended guard intervals. In this case, the interference due to receive windowing depends on the extent of the receive window. If the receive window coefficients are zero on the interval corresponding to the extended guard interval, then interference would be picked on the cyclic prefix interval due to multi-path. If some of the receive window coefficients are non-zero on the interval corresponding to the extended guard interval, then interference would be picked on the extended guard interval and cyclic prefix interval even without multi-path.

Referring to FIG. 16, a first block of data 1600 and a second block of data 1650 are shown. In this case, guard intervals, i.e. cyclic prefixes, are prepended to the respective blocks of data 1600,1650. Postfixes 1610, 1660 are appended to the end of the respective blocks of data 1600, 1650. In this case, the CP 1605, 1655 of each respective block of data 1600, 1650 is used to perform transmit windowing. At the receiver side, after receive windowing, the CP is discarded. In this case, interference is picked up from the cyclic prefix interval even without multi-path.

To understand the cases shown in FIGS. 15 and 16, the received signal on block l may be written as $$y_l = H_{signal}\{PGF^H S_l + H_{signal}\overline{T_a}PGF^H S_{l-1}\} + \qquad \text{Equation (45)}$$
$$H_{isi}P\begin{bmatrix} 0_{\beta \times (N-\beta)} & I_\beta \\ I_N \end{bmatrix} F^H S_{l-1} + n,$$

where $$G = \begin{bmatrix} 0_{\beta \times (N-\beta)} & I_\beta \\ I_N \\ I_{a \times (N-a)} & 0_{a \times (N-a)} \end{bmatrix}, T_a = \begin{bmatrix} 0_{a \times (\hat{N}-a)} & I_a \\ 0_{(\hat{N}-a) \times \hat{N}} \end{bmatrix}. \qquad \text{Equation (46)}$$

The first term of Equation (45) may be described as follows. The data block goes through IFFT. To perform transmit windowing, the last β symbols are copied as the prefix, and the first a symbols are copied as the postfix. Note that, since overlapping of the prefix and postfix of consecutive symbols will be performed, a and β are preferred to be equal. Then, the signal is multiplied by the window coefficients, denoted as the diagonal matrix P, whose diagonal elements are the window coefficients. This transmitted signal goes through the channel.

The second term of Equation (45) is similar to the first term of Equation (45) and contains the coefficients from the previous data block. $\overline{T_a}$ is a matrix that selects the last a samples of the windowed signal to create a vector. The elements of the vector are rearranged from the last coefficient to the first coefficient. This means that the last a samples of the windowed signal is added to the first α samples of the current block. $\hat{N}=N+a+\beta$.

The third term of Equation (45) may be the intersymbol interference from the previous symbol. The received signal is processed by the receive windowing. Depending on the window coefficients, the interference may be estimated and canceled.

Methods and apparatus for applying different windowing functions to separate groups of a received signal will now be described. Different windowing functions may be applied to different sub-bands of the transmission band. As an example, the sub-bands next to the edges may be shaped with longer windows to better reject adjacent channel interference. On the other hand, the sub-bands away from the edges may be shaped with shorter windows. Since windowing may introduce distortion, the possibly larger distortion introduced by the longer windows may be limited to the sub-bands on the edges. An example of this method is shown in FIG. 17.

Figure 17:
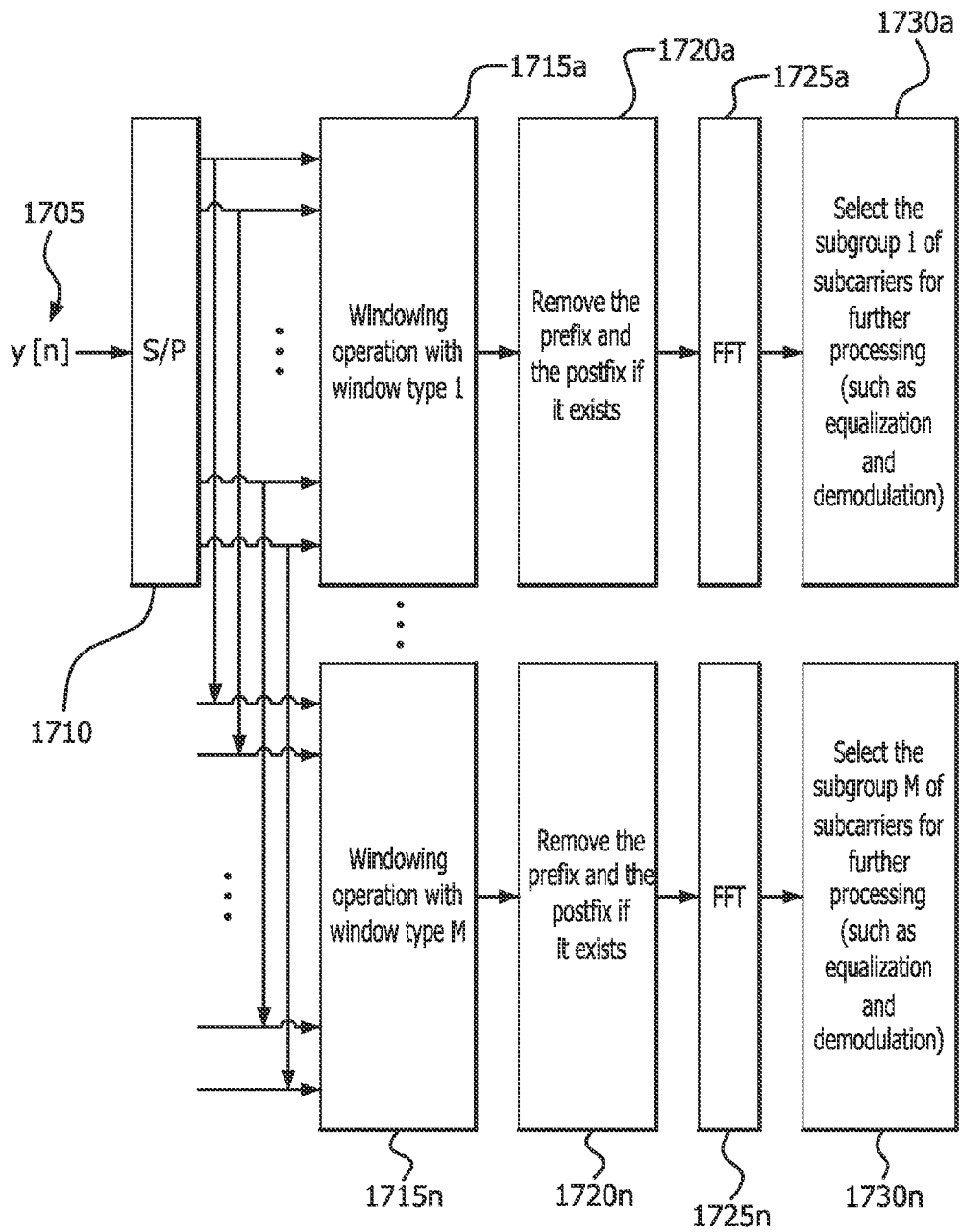
FIG. 17 is a diagram of an example implementation of receiver windowing for non-contiguous sub-bands.

FIG. 17 is a diagram of an example implementation of receiver windowing for non-contiguous sub-bands. Referring to FIG. 17, an OFDM signal y[n] 1705 containing modulated symbols is received and input into a serial-to-parallel converter (S/P) 1710 that samples the received signal y[n] 1705, and divides it into a plurality of subcarriers. It is assumed that m windows will be applied to m different sub-bands. The signal is copied into m branches. For each group, or branch, the appropriate receive windowing is applied at the windowing filters 1715a-n. The receive windowing applied for each group, or branch may different. For example, the receive windowing type as shown in FIG. 10 may be applied to one branch, whereas the receive windowing type as shown in FIG. 13 may be applied to another branch. It should be noted that other windowing types, other than those shown in FIGS. 10 and 13 may be used. Then, for each respective branch, the prefix and postfix are removed, if it exists, at each respective prefix/postfix removal unit 1720a-n. Then, each branch goes through an FFT unit 1725a-n, which converts the data in each branch in the sub-carriers from the time domain back to the frequency domain. For each branch, the samples corresponding to the subcarriers of the sub-band in that branch are selected for further processing at processing units 1730a-n. Such processing may include equalization and demodulation.

The requirements of spectral leakage and interference may change, therefore, adaptation of the windowing function may be beneficial. As discussed previously, the window function at the transmitter shapes the CP and therefore may introduce interference if the unshaped portion of the CP is not long enough to compensate for the channel delay spread. Similarly, windowing at the receiver may introduce interference. There may, however, be a tradeoff between interference and spectral leakage reduction and adjacent channel interference rejection. For example, as the roll-off portion of a window gets longer, e.g., the window gets smoother, spectral leakage reduction at the transmitter and adjacent channel interference rejection at the receiver improves. However, self-created interference, due to ISI and/or ICI may increase.

Accordingly, it may be beneficial to adaptively change the window function depending on the requirements on the spectral leakage and adjacent channel interference rejection.

If the requirements are tight, then a smoother window function may be used at the transmitter and/or receiver at the expense of more ISI/ICI. Otherwise, a less smooth window function may be preferred, resulting in less ISI/ICI. The selection may be done by the receiver or transmitter based on measurements, such as sensing, or the receiver may select the receive window function while the transmitter may select the transmit window function.

In transmit windowing, the window function may be chosen such that the samples corresponding to the data block (e.g., those that are produced by the IFFT before CP attachment) are multiplied by unity (i.e., the weights of the window function are 1). The samples that correspond to the CP and postfix may be multiplied by non-unity weights. If the lengths of the CP, data block, and postfix are k, n, k, respectively, then the total length of the window may be n+2k, with the middle samples indexed by k+1 to k+n being unity. Sometimes, a tight requirement on spectral leakage may necessitate a very smooth window function to be used at the transmitter. But since the size of the CP may be fixed, this may not be possible. One method to overcome this may be to allow some of the n weights of the window function to have non-unity values. For example, Equation (47) below may be used. The smoothness of the window function may be improved significantly without bit error rate (BER) degradation.

$$p[n] = \begin{cases} 0.5\left(1 + \cos\left\{\pi\left(1 + \dfrac{n}{(\beta N_T + b)}\right)\right\}\right) & 0 \le n < \beta N_T + b \\ 1 & \beta N_T + b \le n < (\beta+1)N_T - b \\ 0.5\left(1 + \cos\left\{\pi\dfrac{n - (\beta+1)N_T - b}{(\beta N_T - b)}\right\}\right) & (\beta+1)N_T - b \le n \le (2\beta+1)N_T - 1 \end{cases} \quad \text{Equation (47)}$$

During receiver windowing, the overall performance of the receiver may be improved. In one example, the received signal-interference-to-noise-ratio (SINR) may be improved by adding the samples corresponding to the CP to the end of the received symbol. It should be noted that if windowing is not applied, this operation may be done independently.

For example, the transmitted signal may be written in matrix notation as $$x_l = \begin{bmatrix} 0_{N_G \times (N-N_G)} & I_{N_G} \\ I_N \end{bmatrix} F^H S_l, \quad \text{Equation (48)}$$

where $F^H$ is the inverse fast Fourier transform (IFFT) matrix and $$\begin{bmatrix} 0_{N_G \times (N-N_G)} & I_\beta \\ I_N \end{bmatrix}$$

appends a prefix of $N_G$ samples. The received signal after the channel may be written as $$y_l = H_{signal} \begin{bmatrix} 0_{N_G \times (N-N_G)} & I_{N_G} \\ I_N \end{bmatrix} F^H S_l + \quad \text{Equation (49)}$$

$$H_{isi} \begin{bmatrix} 0_{N_G \times (N-N_G)} & I_{N_G} \\ I_N \end{bmatrix} F^H S_{l-1} + w,$$

where the first part of Equation (49) is the desired signal, the second part is the inter-symbol interference (ISI) from the previous block, and the third part is the noise. The channel matrices in Equation (49) may be written as $$H_{signal} = \begin{bmatrix} h_0 & 0 & \ldots & \ldots & \ldots & 0 \\ \vdots & \ddots & \ddots & \ddots & \ddots & \vdots \\ h_{L-1} & \ldots & h_0 & 0 & \ddots & \vdots \\ 0 & h_{L-1} & \ldots & h_0 & \ddots & \vdots \\ \vdots & \ddots & \ddots & \vdots & \ddots & 0 \\ 0 & \ldots & 0 & h_{L-1} & \ldots & h_0 \end{bmatrix}, \quad \text{Equation (50)}$$

$$H_{isi} = \begin{bmatrix} 0 & \ldots & 0 & h_{L-1} & \ldots & h_1 \\ \vdots & \ddots & \ddots & \ddots & \ddots & \vdots \\ \vdots & \ddots & \ddots & \ddots & 0 & h_{L-1} \\ \vdots & \ddots & \ddots & \ddots & \ddots & 0 \\ \vdots & \ddots & \ddots & \ddots & \ddots & \vdots \\ 0 & \ldots & \ldots & \ldots & \ldots & 0 \end{bmatrix},$$

where $[h_0, h_1, \ldots, h_{L-1}]$ is the channel response of the multipath channel.

In the above example, if the channel order $L=N_G$, then all samples of the cyclic prefix may be contaminated. However, when a wireless communication system is designed, the length of the cyclic prefix, $N_G$, may be selected based on worst case scenarios. Therefore, very often, $L<N_G$, so $N_G-L$ samples of the cyclic prefix may be ISI-free. The initial paths of the channel may have significant power, and the delayed paths may have much less power. Thus, many samples of the cyclic prefix may only be contaminated by low-power ISI.

If sample n of the received OFDM symbol (with the CP) is ISI free, the received OFDM symbol may be expressed as $y[n]=x[n]+w_1[n]$. Due to how the cyclic prefix is formed, sample (n+N) may be written as $y[n+N]=x[n+N]+w_2[n+N]$, where $x[n]=x[n+N]$.

The noise samples $w_1$ and $w_2$ may be independent and may have the same statistics. Assuming they are zero-mean and have variance $\delta^2$, if $y[n]$ and $y[n+N]$ are added, the result may be expressed as $y[n]+y[n+N]=x[n]+x[n+N]+w_1[n]+w_2[n+N]=2x[n]+w_1[n]+w_2[n+N]$.

The SINR of the added symbols may be $$SINR = \frac{4x_n^2}{2\delta^2} = \frac{2P_o}{\delta^2},$$

where $P_o=E\{x_n^2\}$. Accordingly, the power of one sample is doubled (in the time domain) due to the CP being a copy of the original samples. In the frequency domain, assuming the received signal is written as $$y[m] = \sum_{k=0}^{M-1} S_k[\ell]p[m]e^{\frac{j2\pi k(m)}{N}} + w[n], \quad \text{Equation (51)}$$

$$m = -N_G, \ldots, 0, 1, \ldots N-1,$$

the estimate of the transmitted signal on subcarrier $\hat{k}$ may be written as $$\hat{S}_k[\ell] = \left(\frac{1}{\sqrt{N}}\right) \sum_{m=0}^{N-N_G-1} \sum_{k=0}^{N-1} S_k[\ell]p[m]e^{\frac{j2\pi k(m)}{N}} e^{\frac{-j2\pi \hat{k}(m)}{N}} + \quad \text{Equation (52)}$$

$$w[m] + \left(\frac{1}{\sqrt{N}}\right)$$

$$\sum_{m=N-N_G}^{N-1} \left\{ 0.5 \left( \sum_{k=0}^{N-1} S_k[\ell]p[m]e^{\frac{j2\pi k(m)}{N}} + w[n] \right) e^{\frac{-j2\pi \hat{k}(m)}{N}} + \right.$$

$$\left. 0.5 \left( \sum_{k=0}^{N-1} S_k[\ell]p[m]e^{\frac{j2\pi k(m)}{N}} + w[m-N] \right) \right.$$

$$\left. e^{\frac{-j2\pi \hat{k}(m)}{N}} \right\}.$$

From this, the SINR on the subcarrier k may be given as $$SINR_{AWGN}(k) = \quad \text{Equation (53)}$$

$$\frac{P_0}{\{(N-N_G)+0.5N_G\}\frac{\sigma^2}{N}} = \frac{P_0}{\left\{\left(1-\frac{N_G}{N}\right)+0.5\frac{N_G}{N}\right\}\sigma^2}.$$

By way of example, if it is assumed that the CP is 25% of the total symbol duration, and half of the samples are ISI-free, then the improvement in SINR per sample in the frequency domain is 0.3 dB. Assuming that there is a channel with $L_1$ paths, where $L_1 < N_G$, sample n may be written as $y[n]=y[n+N]=\Sigma_{i=0}^{N_G-L_1+1}h[i]x[n-i]$. From this, the SINR improvement per sample in the time domain may be 2x for ISI-free samples. After the IFFT, SINR on the kth subcarrier before equalization may be $SINR_{AWGN}(k)|H(k)|^2$, where H(k) is the FFT of the channel on the kth subcarrier.

Even a small increase in SINR may result in a jump in the rate because the Modulation and Coding Scheme (MCS) works on discrete channel quality indicator (CQI) values. If a small increase results in the next MCS, the rate may be doubled in some scenarios. On the other hand, WTRUs closer to the transmitter may have most of the samples in the CP ISI-free. Further, even if a sample is not ISI-free, it may still be useful if the contribution of the desired signal outweighs the contribution of the ISI. For example, assuming that the received samples are $y[n]=x[n]+w_1[n]+z[n]$ and $y[n+N]=x[n+N]+w_2[n+N]$, where z[n] is the ISI, if y[n] and y[n+N] are added, $y[n]+y[n+N]=x[n]+x[n+N]+w_1[n]+w_2[n+N]+z[n]=2x[n]+w_1[n]+w_2[n+N]+z[n]$. The SINR of the added symbols in the time domain is $$SINR = \frac{4P_o}{2\delta^2 + \sigma_z^2}.$$

If $$SINR = \frac{4P_o}{2\delta^2 + \sigma_z^2} > \frac{P_o}{\delta^2},$$

then it may be beneficial to use that sample from the CP.

When the samples from the CP are added to the samples at the tail of the OFDM symbol, each sample may be divided by 2 so that orthogonality is preserved. This may be due to the orthogonality condition in receive windowing.

The result in Equation (53) may be generalized to the case where a receive window is applied. After receive windowing of the received samples, the CP may be added to the end of the OFDM symbol. Assuming an additive white Gaussian noise (AWGN) channel is used (e.g., ISI has not contaminated the CP samples), the received signal may be:

$$y[n] = \sum_{k=0}^{N-1} S_k[\ell]p[n]e^{\frac{j2\pi k(n)}{N}} + w[n], \quad \text{Equation (54)}$$

$$n = -N_G, \ldots, 0, 1, \ldots N-1,$$

where z[n] is the AWGN with zero mean and variance $\sigma^2$. The estimate of the transmitted data symbol on subcarrier $\hat{k}$ may be written, after windowing with v[n], as $$\hat{S}_k[\ell] = \left(\frac{1}{\sqrt{N}}\right) \sum_{n=0}^{N-N_G-1} \sum_{k=0}^{N-1} S_k[\ell]p[n]e^{\frac{j2\pi k(n)}{N}} e^{\frac{-j2\pi \hat{k}(n)}{N}} + \quad \text{Equation (55)}$$

$$z[n] + \left(\frac{1}{\sqrt{N}}\right)$$

$$\sum_{n=N-N_G}^{N-1} \left\{ v[n] \left( \sum_{k=0}^{N-1} S_k[\ell]p[n]e^{\frac{j2\pi k(n)}{N}} + z[n] \right) e^{\frac{-j2\pi \hat{k}(n)}{N}} + \right.$$

$$\left. (1-v[n]) \left( \sum_{k=0}^{N-1} S_k[\ell]p[n]e^{\frac{j2\pi k(n)}{N}} + z[n-N] \right) \right.$$

$$\left. e^{\frac{-j2\pi \hat{k}(n)}{N}} \right\}$$

From Equation (55), the SINR on the subcarrier k may be given as $$\widetilde{SINR}_{AWGN}(k) = \quad \text{Equation (56)}$$

$$\frac{P_0}{\{(N-N_G)+\Gamma N_G\}\frac{\sigma^2}{N}} = \frac{P_0}{\left\{\left(1-\frac{N_G}{N}\right)+\Gamma\frac{N_G}{N}\right\}\sigma^2},$$

$$\Gamma = \sum_{n=N-N_G}^{N-1} 1 + 2v[n]^2 - 2v[n].$$

Similarly, with a multi-path channel (at the absence of ISI), the SINR becomes $$\widetilde{SINR}(k) = SINR|H(k)|^2 \left\{ \left(1-\frac{N_G}{N}\right) + \Gamma \frac{N_G}{N} \right\}^{-1}.$$

However, due to ISI, windowing may introduce interference, and the exact SINR may depend on the channel model.

With channel estimation, the WTRU may be able to determine the channel delay spread and distribution of the paths. This would allow the WTRU to determine if the CP contains samples that are ISI-free or are contaminated with small enough ISI. Since WTRUs closer to the transmitter may be most likely to benefit from this (i.e., CP length is larger than the delay spread), it may be assumed that they already have better a better signal-to-noise ratio (SNR) and channel estimation may be reliable.

Figure 18:
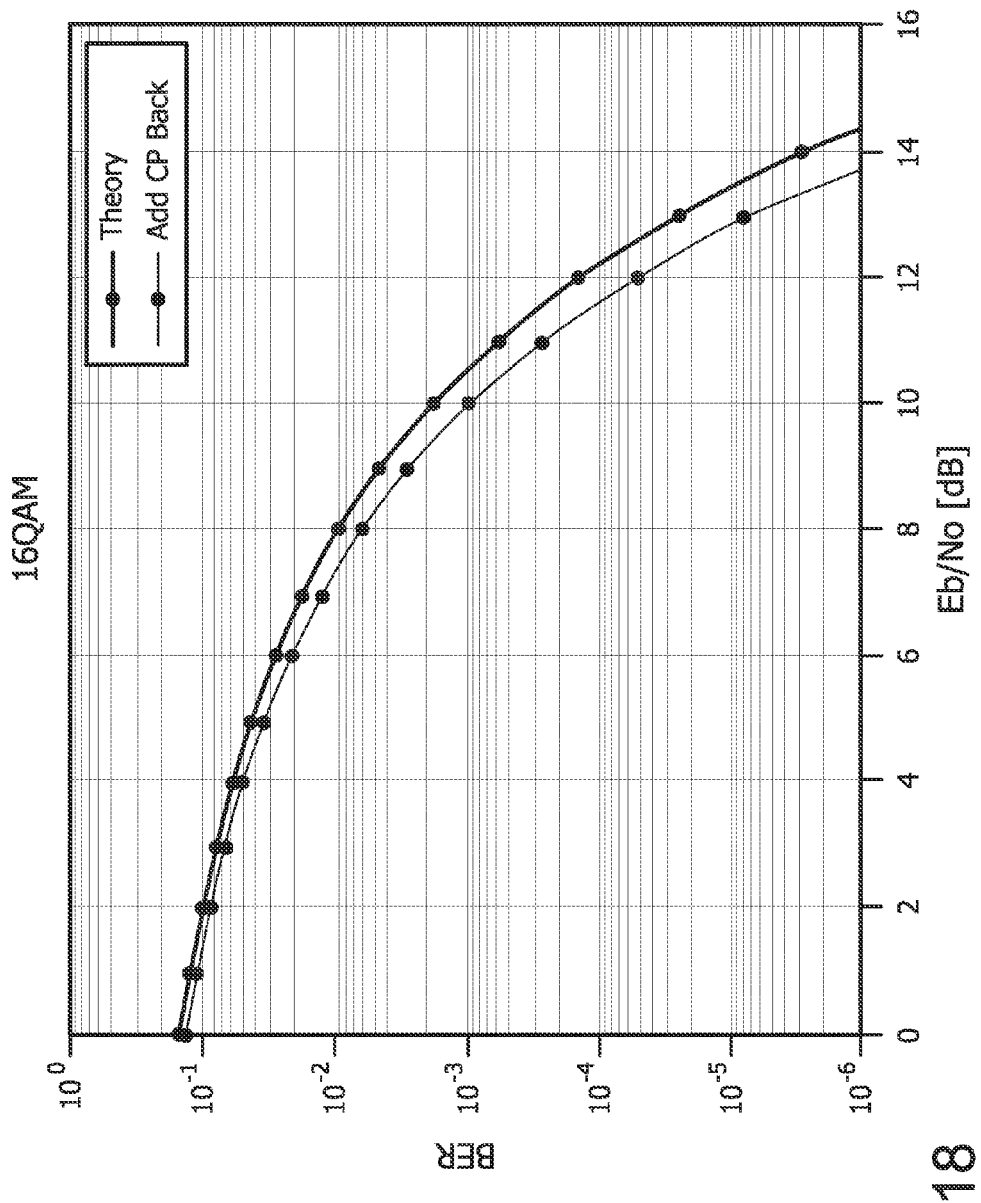
FIG. 18 is a graph depicting the improvement in BER in an AWGN channel due to adding back CP samples when IEEE 802.11af is the underlying radio access medium.

FIG. 18 is a graph depicting the improvement in BER in an AWGN channel due to using CP when IEEE 802.11af is the underlying radio access medium.

As discussed previously, the length of the CP in current wireless systems using CP may be set to one value and may be used for all users. However, in a given transmission area, some users may be experiencing channels with smaller delay spread than others. If that is the case, it may be beneficial to use a shorter CP for those users experiencing channels with smaller delay spread.

Figure 19:
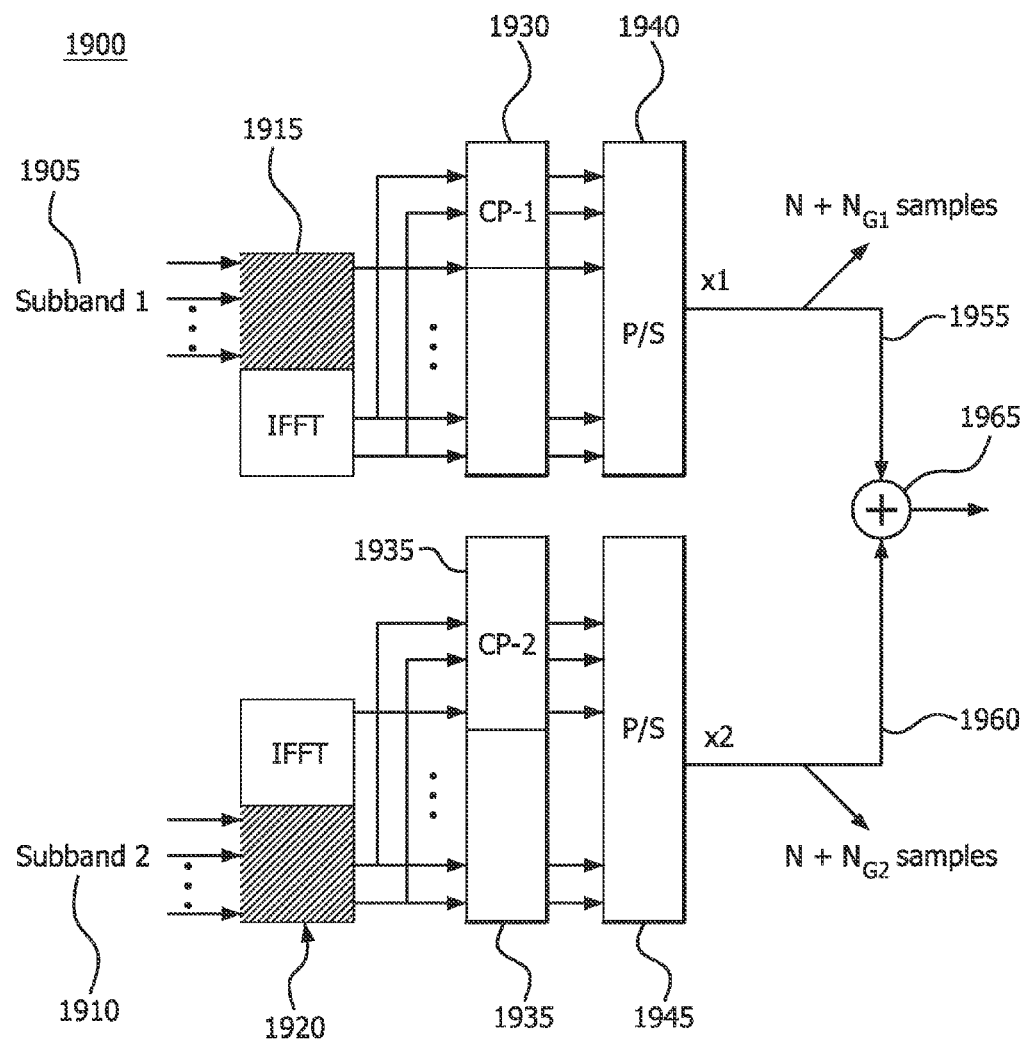
FIG. 19 is a diagram of an example transmitter capable of transmitting symbols with varying CP lengths for different sub-bands.

FIG. 19 is a diagram of an example transmitter 1900 capable of transmitting symbols with varying CP lengths for different sub-bands. In the example illustrated in FIG. 19, only two sub-bands 1905, 1910 are shown. It should be noted that this is for illustration purposes, and there may be any number of sub-bands, and sub-bands may include non-contiguous subcarriers or resource blocks (RBs). The concept of RBs may be generalized as a group of subcarriers, where the RB size (i.e., the number of subcarriers) may vary for different RBs. In addition, the transmitter may not need to be OFDM-based. For example it may be discrete Fourier transform-spread OFDM (DFT-spread-OFDM), as used in the uplink of Third Generation Partnership Project (3GPP) LTE, or pure single carrier (SC). In DFT-spread-OFDM, the data goes through a fast Fourier transform (FFT) before being mapped to the subcarriers. In SC, the CP is directly attached to the time domain signal.

Referring to FIG. 19, for this example, it is assumed that the transmission for each sub-band 1905, 1910 is similar to conventional OFDM. That is, symbols from an input data stream are spread across a plurality of multiple parallel sub-carriers or RBs of multiple sub-bands, sub-bands 1905, 1910 as illustrated in FIG. 19, which are then input into their respective IFFT units, 1915, 1920. Note that FIG. 19 shows multiple IFFT blocks. This is to show that conceptually, m IFFTs are taken. However, in a hardware implementation there may be one IFFT block that may be used m times for different input streams. The IFFT units 1915, 1920 convert the signals in the plurality of sub-carriers or RBs from the frequency domain to corresponding time domain signals. CP, denoted in the illustration as CP-1 and CP-2 is prepended at the respective CP adder units 1930, 1935. As illustrated in FIG. 19, CP-1, which is prepended to the signal corresponding to sub-band 1905 is shorter than CP-2, which is prepended to the signal corresponding to sub-band 1910. A parallel-to-serial converter (P/S) 1940, 1945 receives the respective samples and converts them into their respective OFDM signals 1955, 1960 and adds them at an adder unit 1965 prior to transmission.

Use of a variable CP may cause, in general, ICI. As in the example described in FIG. 19, it is assumed that two symbols are transmitted on two subcarriers and are intended for two different receivers. If one has a longer CP, the p(t) functions are different, and may be written as $$x(t) = S_k p_k(t) \exp(j2\pi F_k t) + S_m p_m(t) \exp(j2\pi F_m t).$$  Equation (57)

At one of the receivers, the data symbol may be estimated as in Equation (58).

$$\hat{S}_k = \int_x^{x+T} x(t) \exp(-j2\pi F_k t) dt =$$  Equation (58)

$$\int_x^{x+T} S_k p_k(t) dt + \int_x^{x+T} S_m p_m(t) \exp(j2\pi (F_m - F_k) t) dt$$

The first part of Equation (58) is the desired signal and the second part is the interference. Integration is performed over an interval of T, and the CP discarded. But, for the interfering signal, this T duration may cover an arbitrary portion of its CP and its data part. Assume that in this T interval, the interfering signal does not jump from one block to a new one, e.g., there is only one data symbol. As shown in Equation (59), there will not be any interference.

$$\int_x^{x+T} S_m p_m(t) \exp\left(j2\pi \frac{1}{T}(m-k)t\right) dt = 0$$  Equation (59)

However, if the T interval covers two symbols, then $$\int_x^y S_m^1 p_m(t) \exp\left(j2\pi \frac{1}{T}(m-k)t\right) dt +$$  Equation (60)

$$\int_y^{x+T} S_m^2 p_m(t) \exp\left(j2\pi \frac{1}{T}(m-k)t\right) dt \neq 0.$$

The same may be true also for multi-path channels since each path introduces a multiplicative coefficient. If the interval T has only one data symbol of the interfering signal, then there will be no interference. So, in general, there may be interference most of the time. The symbols may drift because they have different lengths. For some symbols, orthogonality may be preserved.

Figure 20:
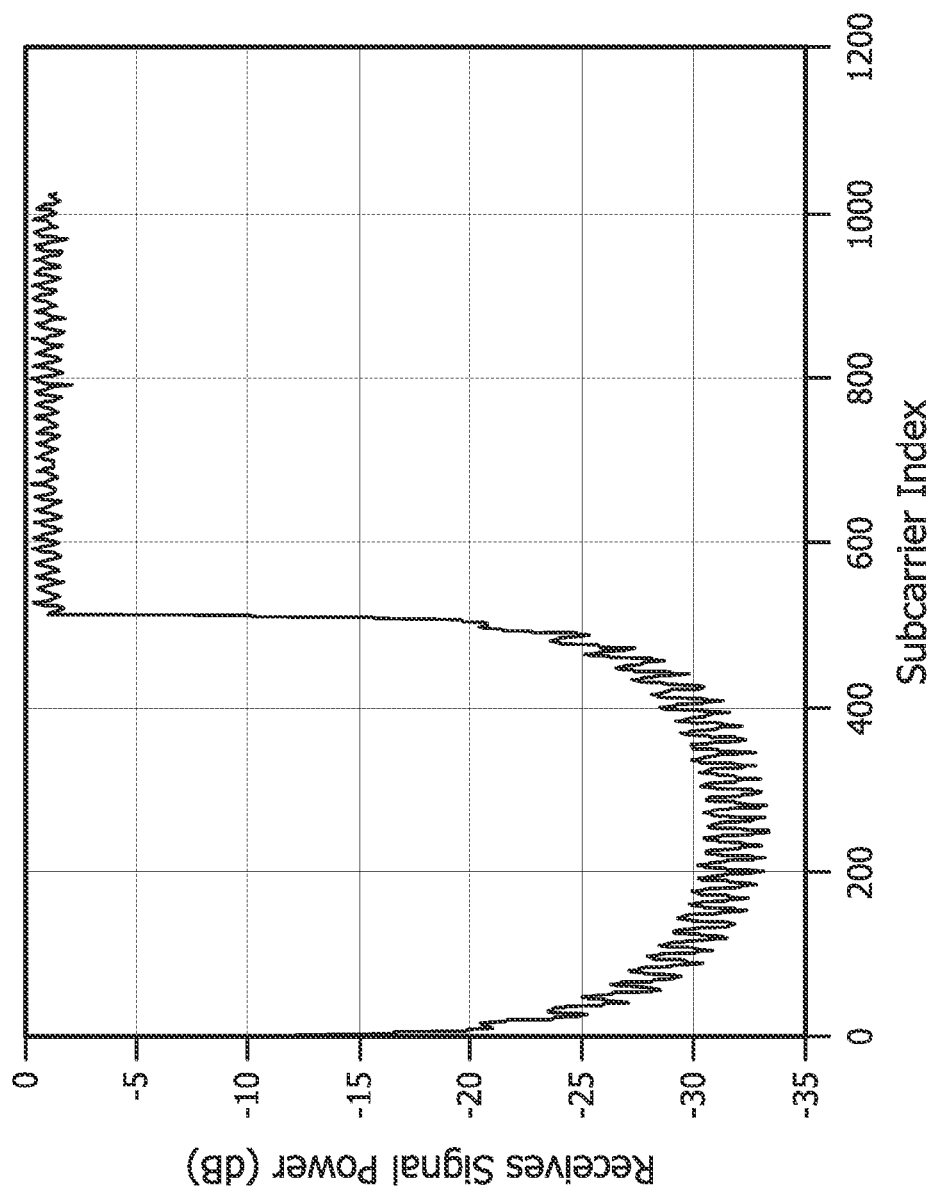
FIG. 20 is a graph illustrating the received interference power in dB at the first receiver.
Figure 21:
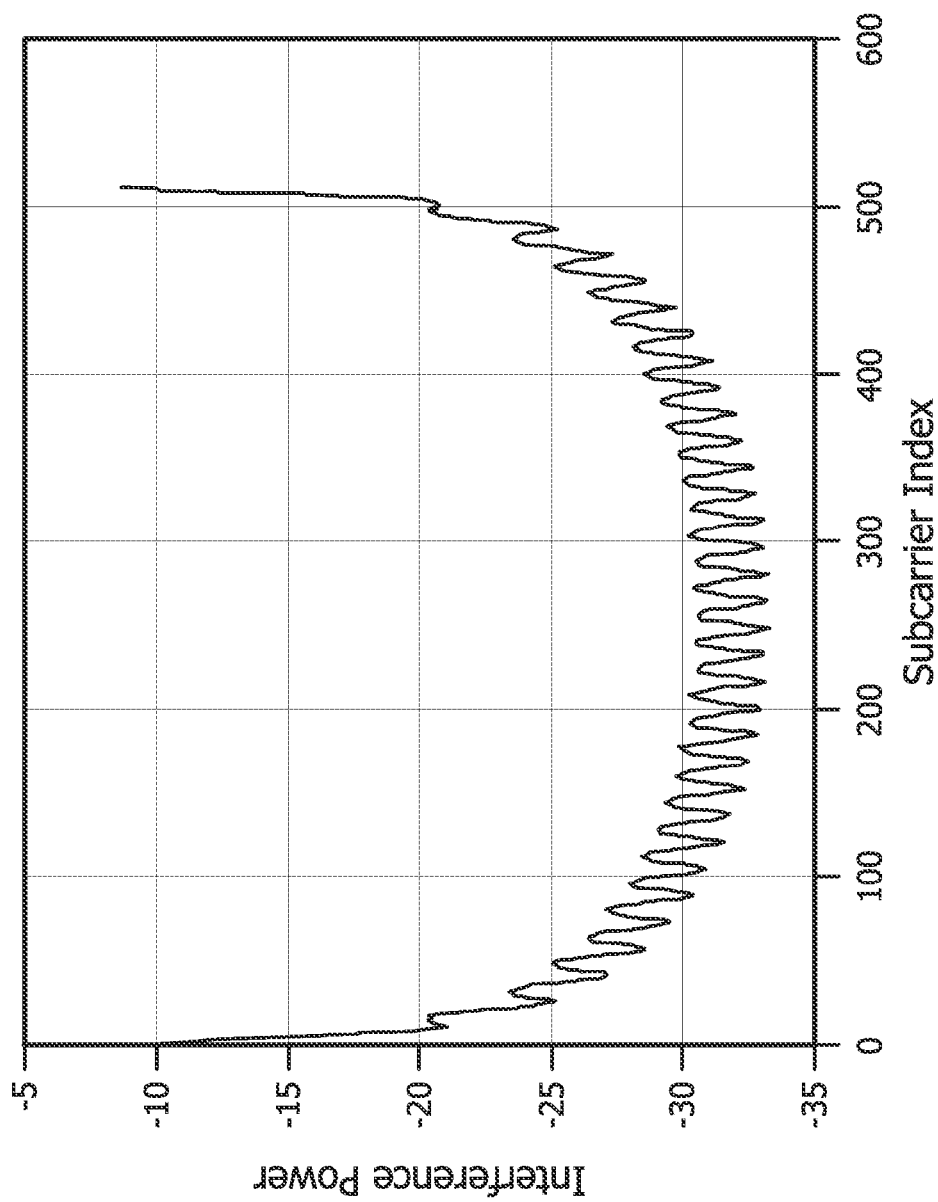
FIG. 21 is a graph showing a close-up view of FIG. 20 that depicts the first half of the spectrum allocated to the first user.

A simulation is described to evaluate the interference power caused by using a variable CP. In this simulation, a transmitter similar to that described above and in FIG. 19 uses 1024 subcarriers. Half of the 1024 subcarriers are reserved for a first receiver. The other half of the 1024 subcarriers are reserved for a second receiver. The CP attached to the signal generated from the first half of the subcarriers has a length of 32 samples. The CP attached to the signal generated from the second half of the subcarriers has a length of 64 samples. FIG. 20 is a graph illustrating the received interference power in dB at the first receiver. FIG. 21 is a graph showing a close-up view of FIG. 20 that depicts the first half of the spectrum allocated to the first user. In the examples provided in FIGS. 20 and 21, the interference due to ICI/ISI created by different CP timings is higher at the edges of the spectrum. The effect of the interference may be reduced by not using several subcarriers between the bands and using filtering or pulse shaping to reduce the out-of-band emission at the transmitter and/or improve interference rejection at the receiver when using variable CP lengths.

Figure 22:
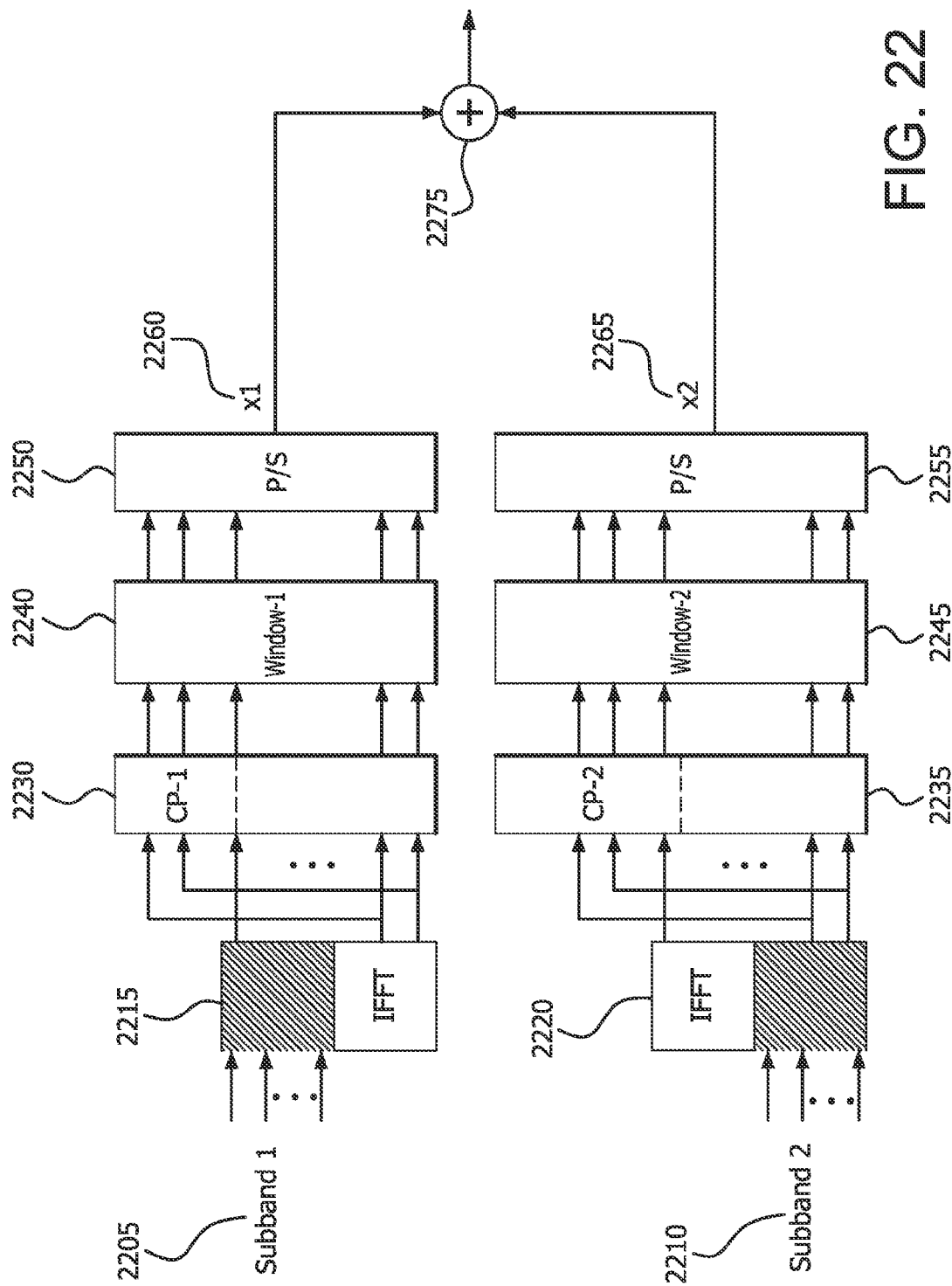
FIG. 22 is a diagram of an example transmitter that uses transmitter windowing to reduce the ICI when using variable CP lengths.

Pulse shaping, or windowing, as described heretofore is one technique that may be used to reduce the ICI at the transmitter when using variable CP lengths. FIG. 22 is a diagram of an example transmitter that uses transmitter windowing to reduce the ICI when using variable CP lengths. In the example illustrated in FIG. 22, only two sub-bands 2205, 2210 are shown. It should be noted that this is for illustration purposes, and there may be any number of sub-bands, and sub-bands may include non-contiguous sub-carriers or RBs. In addition, the transmitter may not need to be OFDM-based.

Referring to FIG. 22, symbols from an input data stream are spread across a plurality of multiple parallel sub-carriers or RBs of multiple sub-bands, sub-bands 2205, 2210 as illustrated in FIG. 22, which are then input into their respective IFFT units, 2215, 2220. Note that FIG. 22 shows multiple IFFT blocks. This is to show that conceptually, m IFFTs are taken. However, in a hardware implementation there may be one IFFT block that may be used m times for different input streams. The IFFT units 2215, 2220 convert the signals in the plurality of sub-carriers or RBs from the frequency domain to corresponding time domain signals. CP, denoted in the illustration as CP-1 and CP-2 is prepended at the respective CP adder units 2230, 2235. As illustrated in FIG. 22, CP-1, which is prepended to the signal corresponding to sub-band 2205 is shorter than CP-2, which is prepended to the signal corresponding to sub-band 2210. The appropriate windowing functions are applied at window filters 2240, 2245. It should be noted that a different windowing function may be used for branch. A parallel-to-serial converter (P/S) 2250, 2255 receives the respective windowed samples and converts them into their respective OFDM signals 2260, 2265. It is important to note that the windowing function may be applied at window filters positioned after parallel-to-serial conversion. The placement of the windowing filters may be implementation specific. The signals 2260, 2265 are then added together at an adder unit 2275 prior to transmission.

Figure 23:
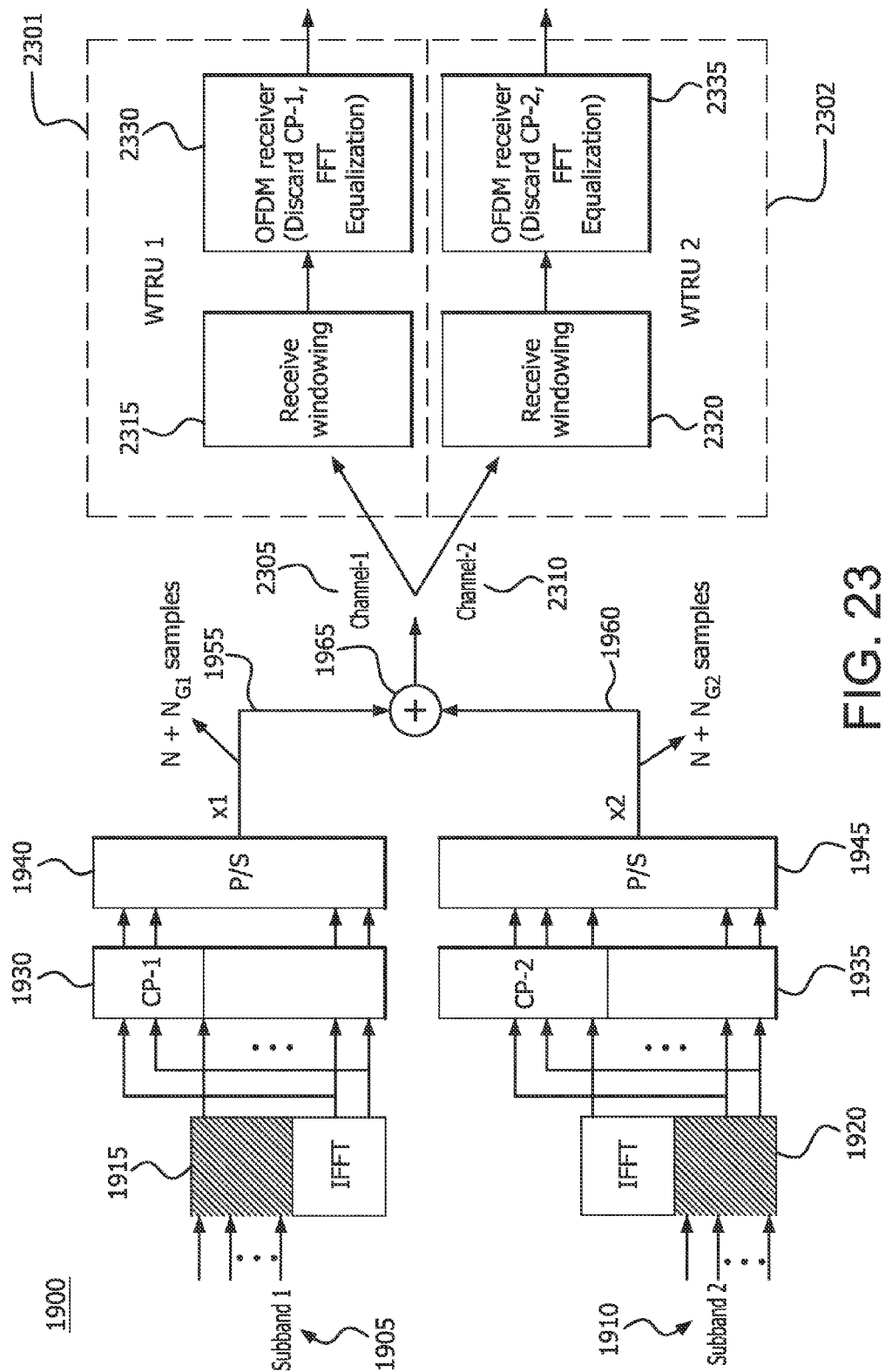
FIG. 23 is a diagram of example receivers that use receiver windowing to reject the interference when using variable CP lengths.

FIG. 23 is a diagram of example receivers that use receiver windowing to reject the interference when using variable CP lengths. The transmitter structure illustrated in FIG. 23 is the same as that shown and described in FIG. 19. The transmitter 1900 transmits the added signals over channels 2305, 2310. The signals are received at the respective receivers 2301, 2302. Each receiver 2301, 2302 corresponds to a different WTRU. Receive windowing may be applied at window filters 2315, 2320, respectively. Note that the windows applied by the WTRUs, in general, may be different. After windowing is applied, the signals are output for additional processing, as shown in blocks 2330, 2335. These processes may include discarding each respective CP, e.g., CP-1 and CP-2, taking the FFT, and equalization. Each WTRU knows the length of CP used for them. Therefore, at the receiver, when CP is discarded, the length of the signal discarded is equal to the CP length.

Figure 24:
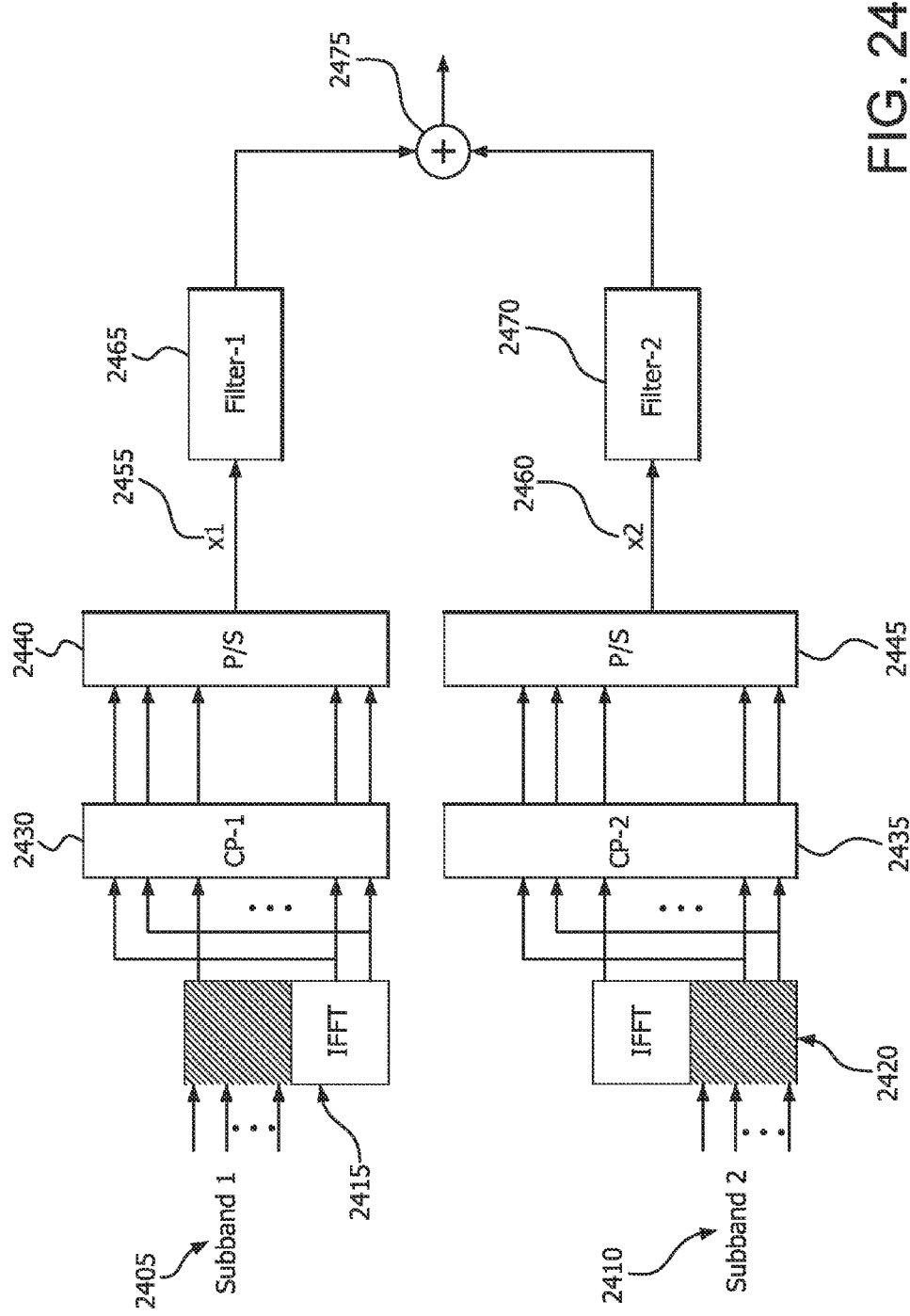
FIG. 24 is a diagram of an example transmitter using transmitter side filtering when using variable CP lengths.
Figure 25:
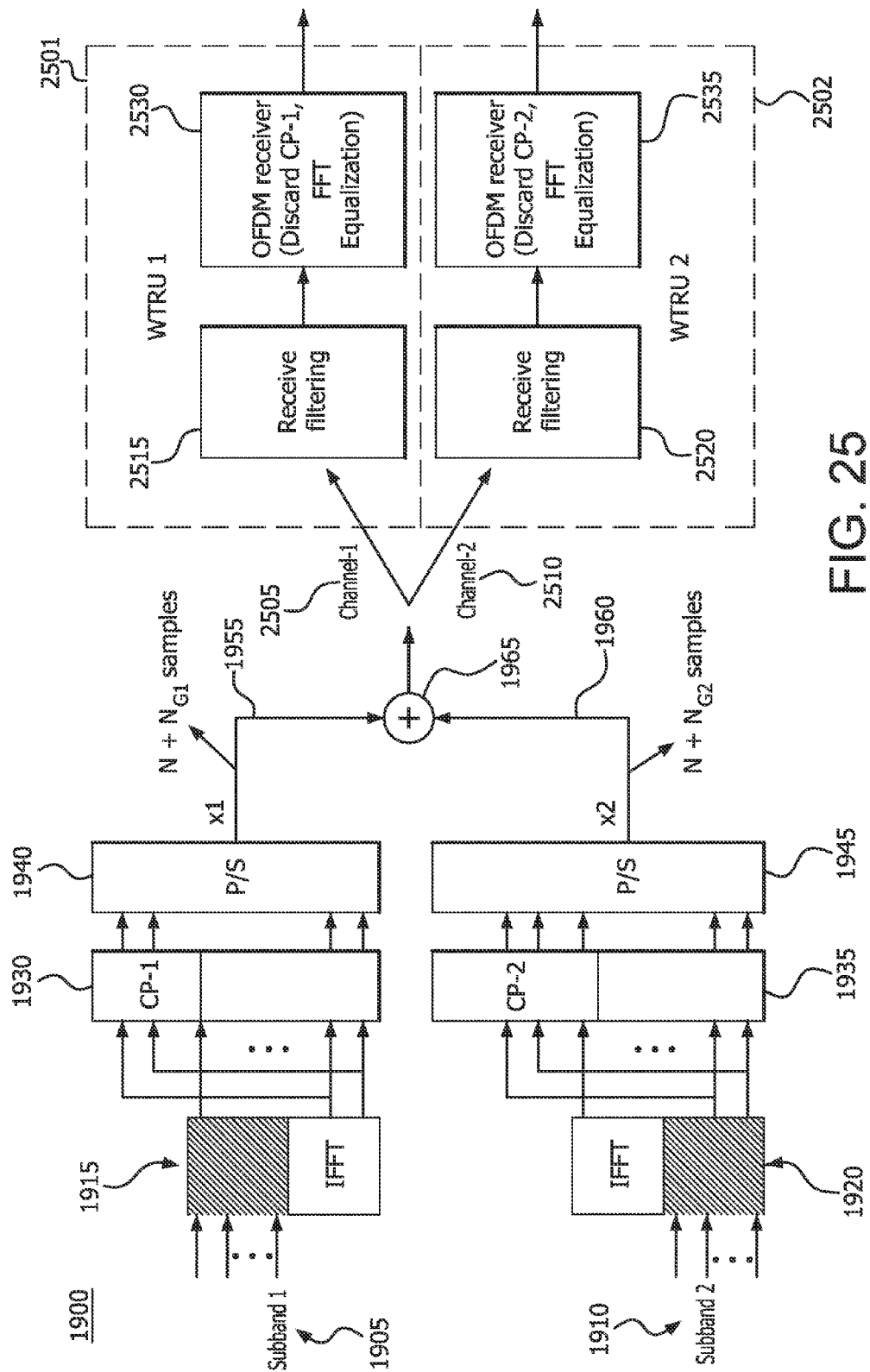
FIG. 25 is a diagram of example receivers that uses receiver side filtering to reject the interference when using variable CP lengths.

Another technique that may be used to reduce the ICI when using variable CP lengths is filtering at the transmitter, at the receiver, or both. FIG. 24 is a diagram of an example transmitter using transmitter side filtering when using variable CP lengths. Referring to FIG. 24, symbols from an input data stream are spread across a plurality of multiple parallel sub-carriers or RBs of multiple sub-bands, sub-bands 2405, 2410 as illustrated in FIG. 24, which are then input into their respective IFFT units, 2415, 2420. Note that FIG. 24 shows multiple IFFT blocks. This is to show that conceptually, m IFFTs are taken. However, in a hardware implementation there may be one IFFT block that may be used m times for different input streams. The IFFT units 2415, 2240 convert the signals in the plurality of sub-carriers or RBs from the frequency domain to corresponding time domain signals. CP, denoted in the illustration as CP-1 and CP-2 is prepended to the signals at the respective CP adder units 2430, 2435. In the example shown in FIG. 24, CP-1, which is prepended to the signal corresponding to sub-band 2405 is shorter than CP-2, which is prepended to the signal corresponding to sub-band 2410. A parallel-to-serial converter (P/S) 2440, 2445 receives the respective samples and converts them into their respective OFDM signals 2455, 2460. The appropriate filtering operations are applied at filters 2465, 2470. It should be noted that the filters, in general, may be different. The signals are then added together at an adder unit 2475 prior to transmission. FIG. 25 is a diagram of example receivers that use receiver side filtering to reject the interference when using variable CP lengths. The transmitter structure illustrated in FIG. 25 is the same as that shown and described in FIG. 19. This for illustration purposes only, as different transmitter structures may be used. The transmitter 1900 transmits the added signals over channels 2505, 2510. The signals are received at the respective receivers 2501, 2502. Each receiver 2501, 2502 corresponds to a different WTRU. Receive filtering may be applied at filters 2515, 2520, respectively. Note that the filters applied by different WTRUs, in general, may be different. After filtering is applied, the signals are output for additional processing, as shown in blocks 2530, 2535. These processes may include discarding each respective CP, (e.g., CP-1 and CP-2), taking the FFT, and equalization. Each WTRU knows the length of CP used for them. Therefore, at the receiver, when CP is discarded, the length of the signal discarded is equal to the CP length. In addition, as previously noted, the sub-bands used for transmission may consist of non-contiguous subcarriers or RBs. Here, filtering may become challenging but may be addressed by either having each sub-band include only contiguous sub-carriers or dividing each sub-band into sub-units (e.g., RBs), filtering each RB separately, and adding the signals from each sub-unit to form the final signal. This may be similar to resource block filtered OFDM (RB-F-OFDM).

Figure 26:
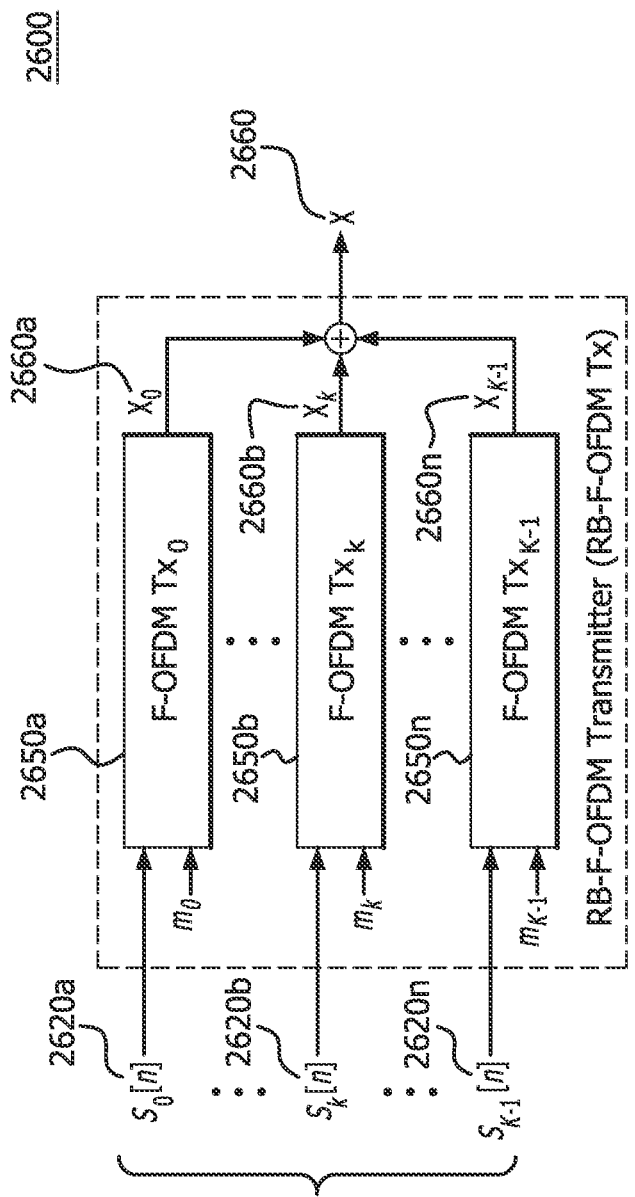
FIG. 26 is a diagram of an example RB-F-OFDM based transmitter.

FIG. 26 is a diagram of an example RB-F-OFDM based transmitter 2600. Referring to FIG. 26, the RB-F-OFDM transmitter 2600 comprises multiple filtered-OFDM transmit modules (F-OFDM Tx) 2650a, 2650b, . . . , 2650n, one for each RB, which output per-RB multicarrier modulated signals 2660a, 2660b, . . . , 2660n for each RB from the respective symbol vectors 2620a, 2620b, . . . , 2620n. of each RB. The per-RB multicarrier modulated signals 2660a, 2660b, . . . , 2660n form the transmit signal 2660 when summed together. The RB-F-OFDM transmitter 2600 is different than CP-OFDM transmitters or filtered OFDM transmitters, in that the per-RB filtered-OFDM transmit modules 2650a, 2650b, . . . , 2650n, comprised in the RB-F-OFDM transmitter 2600, each only modulate the subcarriers in one RB and therefore, the low rate of OFDM signal may be generated and then up-converted to a high rate.

Each per-RB multicarrier modulated signal 2660a, 2660b, . . . , 2660n only has a signal overlapping its adjacent RBs but not the RBs beyond its adjacent RBs. It is assumed that a per-RB transmit filter brings the signal leakage of a per-RB multicarrier modulated signal to its non-adjacent RBs to be negligible. The signal overlap between adjacent RBs may not create inter-subcarrier interference due to orthogonality between subcarriers in different RBs.

Figure 27:
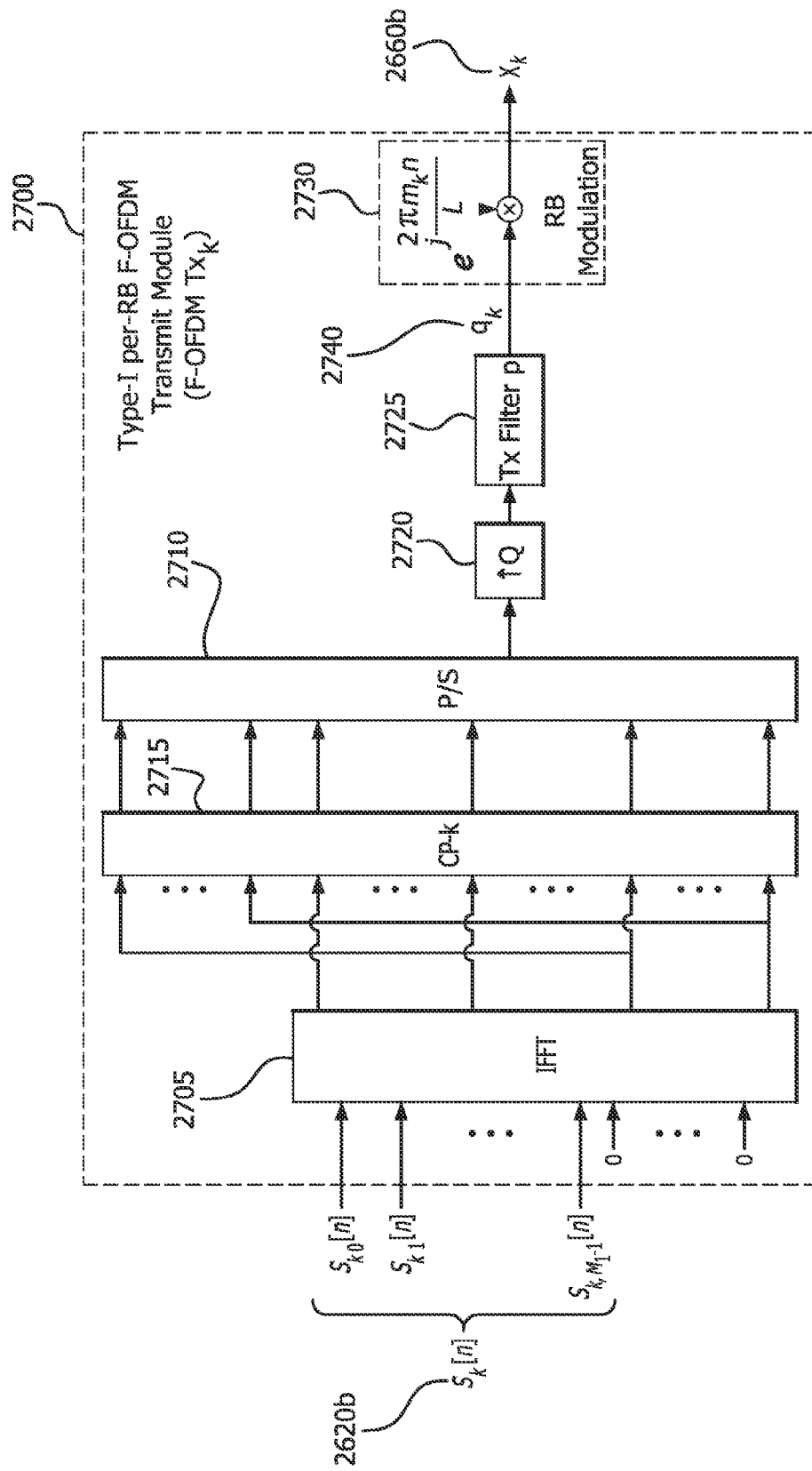
FIG. 27 is a diagram of an example Type-I per-RB F OFDM transmit module (F-OFDM $Tx_k$)

FIG. 27 is a diagram of an example Type-I per-RB F OFDM transmit module (F-OFDM $Tx_k$) 2700. The F-OFDM $Tx_k$ 2700 may be used as the per-RB filtered-OFDM transmit module 2650 in the RB-F-OFDM transmitter 2600 as shown in FIG. 26. Referring to FIG. 27, the F-OFDM $Tx_k$ 2700 comprises an IFFT unit 2705, a parallel-to-serial converter (P/S) 2710, a CP adder unit 2715, an upsampling unit 2720, a transmit filter 2725, and a RB modulation unit 2730. The IFFT of the symbol vectors for the kth RB 2620b is taken at the IFFT unit 2705. CP is prepended at CP adder unit 2715. Note that CP of length k is prepended. CPs attached in different RBs do not need to be of the same length. Parallel-to-serial conversion is performed at P/S 2710. The signal is then upsampled at the upsampling unit 2720. After upsampling, the signal is filtered at transmit filter 2725 which outputs the filtered signal 2740. The filtered signal 2740 is modulated into the frequency band of the kth RB at the RB modulation unit 2730 to form the per-RB multicarrier modulated signal 2660b. Which is summed with the other per-RB multicarrier modulated signals 2660a, ..., 2660n to form the transmit signal 2660 as shown in FIG. 26.

Figure 28:
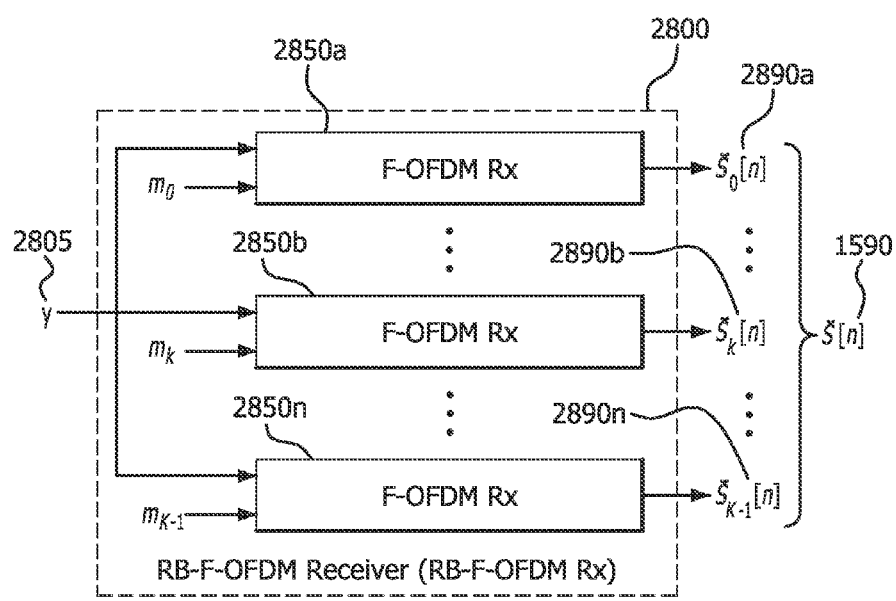
FIG. 28 is a diagram of an example RB F-OFDM Receiver (RB-F-OFDM Rx) corresponding to the RB F-OFDM transmitter in FIG. 26.

FIG. 28 is a diagram of an example RB F-OFDM Receiver (RB-F-OFDM Rx) corresponding to the RB F-OFDM transmitter 2600 in FIG. 26. Referring to FIG. 28, the RB-F-OFDM receiver 2800 comprises per-RB F-OFDM receive modules 2850a, 2850b, ..., 2850n, that output per-RB demodulated symbol vectors 2890a, 2890b, ..., 2890n for each RB from the received multicarrier modulated signal 2805. The RB-F-OFDM receive modules 2850a, 2850b, ..., 2850n each only demodulate the subcarriers in one RB and therefore, the signal may be down-converted to low rate and then demodulated.

Figure 29:
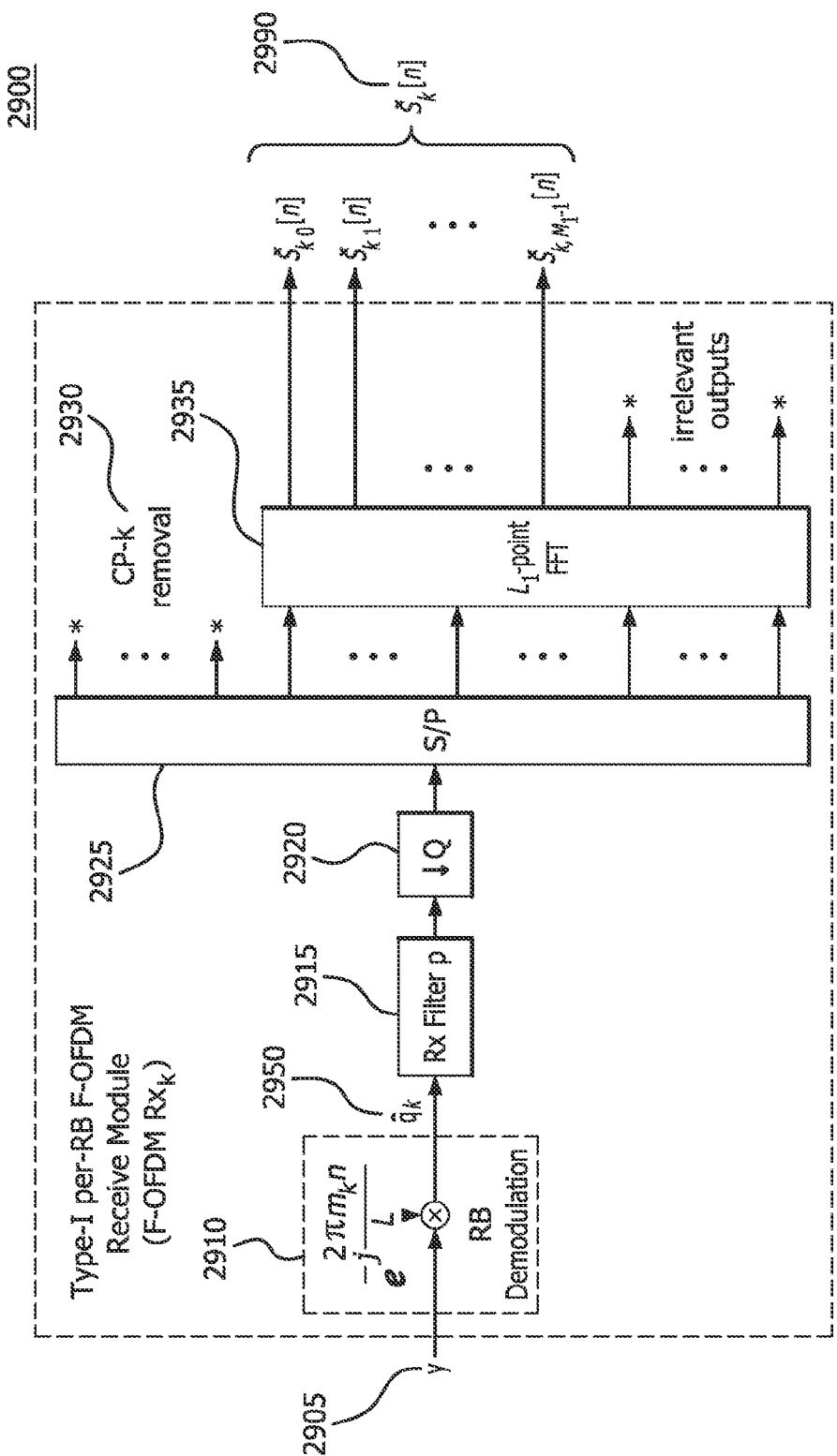
FIG. 29 is a diagram of an example Type-I per-RB F-OFDM receive module (F-OFDM $Rx_k$)

FIG. 29 is a diagram of an example Type-I per-RB F-OFDM receive module (F-OFDM $Rx_k$) 2900. The F-OFDM $Rx_k$ may be used as the per-RB-filtered-OFDM OFDM receive module 1650 in the RB-F-OFDM receiver 2800 as shown in FIG. 28. The OFDM $Rx_k$ shown in FIG. 29 has reverse operations of the F-OFDM $Tx_k$ shown in FIG. 27. The F-OFDM $Rx_k$ 2900 comprises a RB demodulation unit 2910, a receive filter 2915, a downsampling unit 2920, a serial-to-parallel converter (S/P) 2925, a CP removal unit 2930, and an FFT unit 2935. Referring to FIG. 29, for the kth RB, the received signal 2905 is demodulated from the frequency band of the kth RB to baseband at the RB demodulation unit 2910 to form a RB demodulated signal 2950. The RB demodulated signal 2950 is then filtered at filter 2915. The filtered signal is downsampled at the downsampling unit 2920, the S/P converter 2925, and the CP removal unit 2930. Note that here, the CP that is discarded may be different for each RB. The FFT is taken at the FFT unit 2935. The outputs from the FFT unit 2935 form the demodulated symbol vectors 2990. The demodulated symbol vectors are obtained RB by RB this way, similar to FIG. 28.

Since the transmitter will be able to use CPs of different lengths at a given time, the frame structure may need to be addressed.

One option is to keep the subframe length unchanged but to change the number of OFDM symbols depending on the CP length. This will result in a different amount of data blocks existing in different signals. FIG. 30 is a diagram of an example frame structure corresponding to two signals 3000, 3001. In the example illustrated in FIG. 30, it is assumed that the transmitter generates OFDM symbols with two different CPs 3005, 3010. As shown in FIG. 30, the length of CP 3005 in signal 3000 is shorter than the length of CP 3010 in signal 3001. The lengths of the data parts 3015a, 3015b of the OFDM symbols in the respective signals 3000, 3001, in the illustrated example are the same. Since the CP 3010 is longer than CP 3005, the transmitter will fit a smaller number of OFDM data blocks 3015b when using the longer CP 3010. Thus, signal 3001 may contain less OFDM data blocks 3015b than the OFDM data blocks 3015a in signal 3000.

In an example, assume the transmitter is LTE-based and uses short and long CP simultaneously. The subframe length is 1 ms. Here, 14 OFDM data blocks may exist in the first signal, and 12 OFDM data blocks may exist in the second signal.

FIG. 31 is a diagram of another example frame structure corresponding to two signals 3100, 3101. In the example illustrated in FIG. 31, different frame formats correspond to different signals. Referring to FIG. 31, it is assumed that the transmitter generates OFDM symbols with two different CPs 3105, 3110. As shown in FIG. 31, the length of CP 3105 in signal 3100 is shorter than the length of CP 3110 in signal 3101. The lengths of the data parts 3115 of the OFDM symbols in the illustrated example are the same. Note that the subframe corresponding to signal 3100 is shorter than the subframe corresponding to signal 3101. Therefore, the same number of OFDM data blocks may be included in each signal.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for transmitting using a plurality of different sub-bands of a transmission band in a wireless communication device, the method comprising:
   mapping a plurality of data symbols on each of a plurality of corresponding subcarriers in the plurality of different sub-bands;
   processing each of the plurality of different sub-bands to generate an output signal for each of the plurality of different sub-bands;
   attaching each output signal with a prefix for each of the plurality of different sub-bands to generate a plurality of second signals to be transmitted in a time duration, wherein for at least two sub-bands of the plurality of second signals a length of the prefix and a number of data symbols are different while the time duration is the same;
   applying filtering to each of the plurality of second signals to generate a plurality of filtered signals, wherein at least two different filters are applied to one or more of the plurality of second signals; and
   transmitting the plurality of filtered signals at the same time in the time duration.

2. The method of claim 1, wherein a windowing function with a long window is applied to sub-bands adjacent to edges of the transmission band.

3. The method of claim 1, wherein a windowing function with a short window is applied to sub-bands distant from edges of the transmission band.

4. The method of claim 1, wherein the plurality of subcarriers in the plurality of different sub-bands are non-contiguous.

5. The method of claim 1, further comprising:
adaptively changing a windowing function based on spectral leakage and adjacent channel interference rejection requirements.

6. A wireless communications device configured to communicate using a plurality of different sub-bands of a transmission band, the wireless communication device comprising:
a processor configured to:
map a plurality of data symbols on each of a plurality of corresponding subcarriers in the plurality of different sub-bands;
process each of the plurality of different sub-bands to generate an output signal for each of the plurality of different sub-bands;
attach each output signal with a prefix for each of the plurality of different sub-bands to generate a plurality of second signals to be transmitted in a time duration, wherein for at least two sub-bands of the plurality of second signals a length of the prefix and a number of data symbols are different while the time duration is the same;
apply filtering to each of the plurality of second signals to generate a plurality of filtered signals, wherein at least two different filters are applied to one or more of the plurality of second signals; and
a transmitter operatively connected to the processor, the processor and transmitter configured to transmit the plurality of filtered signals at the same time in the time duration.

7. The wireless communication device of claim 6, wherein a windowing function with a long window is applied to sub-bands adjacent to edges of the transmission band.

8. The wireless communication device of claim 6, wherein a windowing function with a short window is applied to sub-bands distant from edges of the transmission band.

9. The wireless communication device of claim 6, wherein the plurality of subcarriers in the plurality of different sub-bands are non-contiguous.

10. The wireless communication device of claim 6, wherein the processor is further configured to adaptively change a windowing function based on spectral leakage and adjacent channel interference rejection requirements.

11. A method for transmitting using a plurality of different sub-bands of a transmission band in a wireless communication device, the method comprising:
mapping a plurality of data symbols on each of a plurality of corresponding subcarriers in the plurality of different sub-bands;
processing each of the plurality of different sub-bands to generate an output signal for each of the plurality of different sub-bands;
attaching each output signal with a prefix and a postfix for each of the plurality of different sub-bands to generate a plurality of second signals to be transmitted in a time duration, wherein for at least two sub-bands of the plurality of second signals a length of the prefix and a number of data symbols are different while the time duration is the same;
applying filtering to each of the plurality of second signals to generate a plurality of filtered signals, wherein at least two different filters are applied to one or more of the plurality of second signals;
attaching a prior postfix in front of the prefix to each of the filtered signals, wherein the prior postfix comprises the postfix used immediately prior to a currently filtered signal; and
transmitting the plurality of filtered signals at the same time in the time duration.

* * * * *